United States Patent
Mori et al.

(10) Patent No.: US 10,129,433 B2
(45) Date of Patent: Nov. 13, 2018

(54) CHARGE DETERMINING INFORMATION PROCESSING APPARATUS, CHARGE PROCESSING METHOD, AND COMPUTER-READABLE RECORDING MEDIUM

(71) Applicants: Takuya Mori, Tokyo (JP); Junki Aoki, Kanagawa (JP); Yukinori Ishii, Kanagawa (JP); Atsushi Okazato, Kanagawa (JP); Fumiyoshi Kittaka, Kanagawa (JP); Tomohiro Kuroyanagi, Tokyo (JP); Hiroyuki Sakuyama, Tokyo (JP); Tohru Sasaki, Kanagawa (JP); Makoto Sasaki, Kanagawa (JP); Koichiro Maemura, Kanagawa (JP)

(72) Inventors: Takuya Mori, Tokyo (JP); Junki Aoki, Kanagawa (JP); Yukinori Ishii, Kanagawa (JP); Atsushi Okazato, Kanagawa (JP); Fumiyoshi Kittaka, Kanagawa (JP); Tomohiro Kuroyanagi, Tokyo (JP); Hiroyuki Sakuyama, Tokyo (JP); Tohru Sasaki, Kanagawa (JP); Makoto Sasaki, Kanagawa (JP); Koichiro Maemura, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 260 days.

(21) Appl. No.: 15/064,723

(22) Filed: Mar. 9, 2016

(65) Prior Publication Data
US 2016/0277630 A1   Sep. 22, 2016

(30) Foreign Application Priority Data
Mar. 20, 2015  (JP) .................. 2015-057296

(51) Int. Cl.
*H04N 1/34* (2006.01)
*H04N 1/00* (2006.01)
*H04N 1/32* (2006.01)

(52) U.S. Cl.
CPC ......... *H04N 1/344* (2013.01); *H04N 1/00244* (2013.01); *H04N 1/32529* (2013.01); *H04N 1/32539* (2013.01); *H04N 2201/0094* (2013.01)

(58) Field of Classification Search
CPC .............................. H04N 1/344; H04N 1/342
See application file for complete search history.

(56) References Cited

U.S. PATENT DOCUMENTS

| 2002/0026379 | A1* | 2/2002 | Chiarabini | G06Q 10/20 705/305 |
| 2003/0088476 | A1* | 5/2003 | Simpson | G06Q 30/06 705/26.5 |

(Continued)

FOREIGN PATENT DOCUMENTS

| JP | 2008-040740 | 2/2008 |
| JP | 2010-073016 | 4/2010 |
| JP | 4497967 | 4/2010 |

*Primary Examiner* — Nicholas Pachol
(74) *Attorney, Agent, or Firm* — Harness, Dickey & Pierce, P.L.C.

(57) ABSTRACT

An information processing apparatus includes a provider identification information acquiring unit that acquires a piece of provider identification information for each of a plurality of devices that cooperatively execute a plurality of functions, based on device identification information of the device, the piece of provider identification information allowing identification of whether a provider of the device is a predetermined provider as a provider of a cooperating function; a determining unit that determines whether a non predetermined-provider device provided by a provider other than the predetermined provider exists among the devices (Continued)

based on pieces of the provider identification information; a charge processing unit that performs charge processing to profit the predetermined provider when the non predetermined-provider device exists; and a cooperation controlling unit that controls the devices to cooperatively execute the functions based on the cooperating function.

13 Claims, 21 Drawing Sheets

(56) References Cited

U.S. PATENT DOCUMENTS

| | | | |
|---|---|---|---|
| 2005/0206949 A1* | 9/2005 | Iseki | G03G 21/02 358/1.15 |
| 2008/0094667 A1 | 4/2008 | Kodaira | |
| 2008/0181651 A1* | 7/2008 | Takesada | G03G 21/02 399/82 |
| 2009/0094694 A1 | 4/2009 | Kodaira | |
| 2010/0073705 A1* | 3/2010 | Cain | H04N 1/00222 358/1.15 |
| 2010/0073712 A1* | 3/2010 | Cain | G06F 3/1204 358/1.15 |
| 2011/0170139 A1 | 7/2011 | Shozaki | |
| 2012/0023451 A1* | 1/2012 | Kuroyanagi | G06F 8/38 715/835 |
| 2012/0218594 A1* | 8/2012 | Komine | G06F 3/1211 358/1.15 |
| 2013/0027736 A1 | 1/2013 | Kittaka | |
| 2014/0160530 A1 | 6/2014 | Kittaka | |
| 2014/0362407 A1 | 12/2014 | Sasaki et al. | |
| 2015/0271353 A1 | 9/2015 | Nishimura et al. | |
| 2015/0286445 A1 | 10/2015 | Kittaka | |
| 2017/0017442 A1* | 1/2017 | Ishii | G06F 3/1206 |
| 2017/0070642 A1* | 3/2017 | Miyamoto | B41J 29/00 |
| 2017/0322691 A1* | 11/2017 | Tokuchi | G06F 3/0484 |
| 2017/0322759 A1* | 11/2017 | Tokuchi | G06F 3/14 |

* cited by examiner

FIG.6

| ROW INDEX | FUNCTION IDENTIFICATION INFORMATION | PROVIDER IDENTIFICATION INFORMATION | DEVICE IDENTIFICATION INFORMATION |
|---|---|---|---|
| 1 | AA.AA.AA.AA | COMPANY R | DOCUMENT READING FUNCTION |
| 2 | BB.BB.BB.BB | COMPANY α | PRINTING FUNCTION |

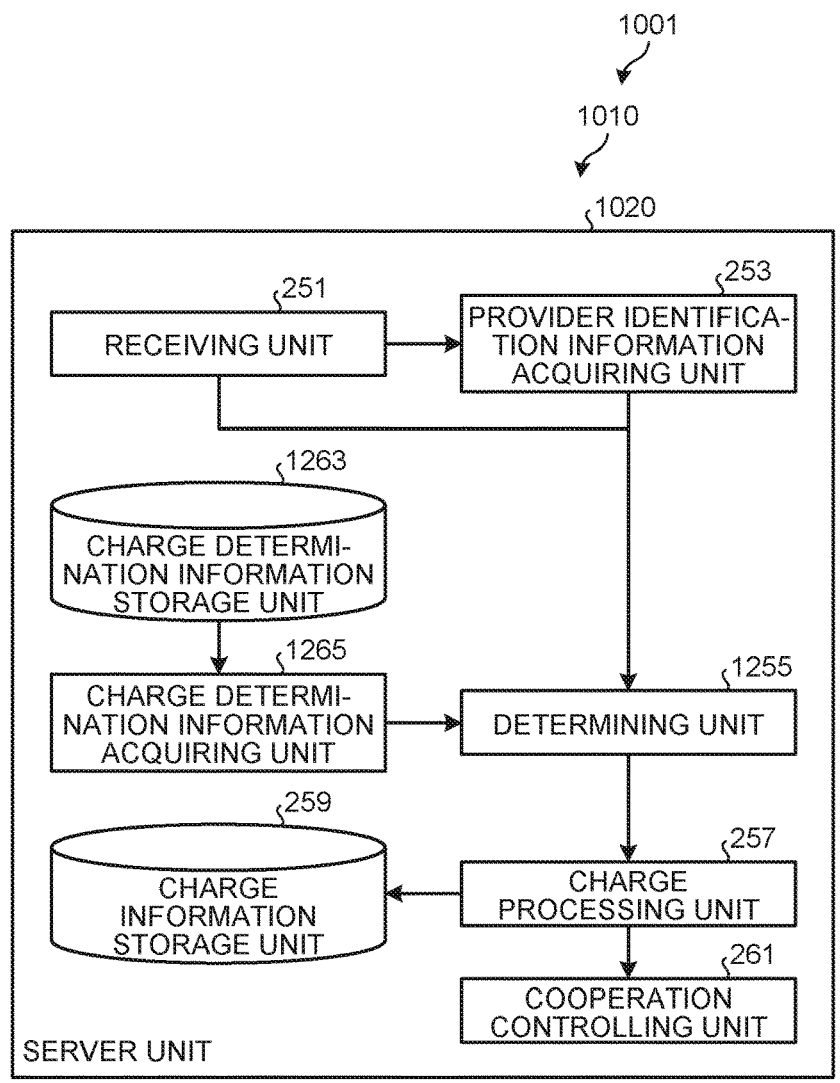

| DEVICE IDENTIFICATION INFORMATION | CHARGE NECESSITY INFORMATION | REFERENCE CHARGE AMOUNT INFORMATION |
|---|---|---|
| DOCUMENT READING FUNCTION | NOT TO BE CHARGED | - |
| BLACK-AND-WHITE PRINTING FUNCTION | TO BE CHARGED | 10 YEN |
| COLOR PRINTING FUNCTION | TO BE CHARGED | 50 YEN |

FIG.13

| ROW INDEX | FUNCTION IDENTIFICATION INFORMATION | PROVIDER IDENTIFICATION INFORMATION | DEVICE IDENTIFICATION INFORMATION |
|---|---|---|---|
| 1 | AA.AA.AA.AA | COMPANY R | DOCUMENT READING FUNCTION |
| 2 | BB.BB.BB.BB | COMPANY α | BLACK-AND-WHITE PRINTING FUNCTION |

FIG.14

| ROW INDEX | FUNCTION IDENTIFICATION INFORMATION | PROVIDER IDENTIFICATION INFORMATION | DEVICE IDENTIFICATION INFORMATION |
|---|---|---|---|
| 1 | AA.AA.AA.AA | COMPANY R | DOCUMENT READING FUNCTION |
| 2 | BB.BB.BB.BB | COMPANY α | COLOR PRINTING FUNCTION |

FIG.15

| ROW INDEX | FUNCTION IDENTIFICATION INFORMATION | DEVICE IDENTIFICATION INFORMATION | CHARGE NECESSITY INFORMATION |
|---|---|---|---|
| 1 | AA.AA.AA.AA | DOCUMENT READING FUNCTION | NOT TO BE CHARGED |
| 2 | CC.CC.CC.CC | DOCUMENT READING FUNCTION | NOT TO BE CHARGED |
| 3 | CC.CC.CC.CC | PRINTING FUNCTION | TO BE CHARGED |

FIG.18

| ROW INDEX | FUNCTION IDENTIFICATION INFORMATION | DEVICE IDENTIFICATION INFORMATION | FAULT OCCURRENCE INFORMATION |
|---|---|---|---|
| 1 | AA.AA.AA.AA | DOCUMENT READING FUNCTION | NOT AT FAULT |
| 2 | CC.CC.CC.CC | DOCUMENT READING FUNCTION | NOT AT FAULT |
| 3 | CC.CC.CC.CC | PRINTING FUNCTION | AT FAULT |

FIG.20

| ROW INDEX | FUNCTION IDENTIFICATION INFORMATION | PROVIDER IDENTIFICATION INFORMATION | DEVICE IDENTIFICATION INFORMATION |
|---|---|---|---|
| 1 | AA.AA.AA.AA | COMPANY R | DOCUMENT READING FUNCTION |
| 2 | BB.BB.BB.BB | COMPANY α | PRINTING FUNCTION |
| 3 | BB.BB.BB.BB | COMPANY α | PRINTING FUNCTION |
| 4 | DD.DD.DD.DD | COMPANY β | PRINTING FUNCTION |

CHARGE DETERMINING INFORMATION PROCESSING APPARATUS, CHARGE PROCESSING METHOD, AND COMPUTER-READABLE RECORDING MEDIUM

CROSS-REFERENCE TO RELATED APPLICATIONS

The present application claims priority to and incorporates by reference the entire contents of Japanese Patent Application No. 2015-057296 filed in Japan on Mar. 20, 2015.

BACKGROUND OF THE INVENTION

1. Field of the Invention

The present invention relates to an information processing apparatus, a charge processing method, and a computer-readable recording medium having a computer program.

2. Description of the Related Art

There are conventional known techniques of cooperating a plurality of devices to achieve a function that otherwise cannot be achieved by each device alone or to achieve distributed execution of an identical function over a plurality of devices. For example, Japanese Patent Application Laid-open No. 2010-73016 discloses a technique of performing charge processing for a lone operation when a device is operated alone and performing charge processing for cooperation when a device cooperates with an external server.

However, the conventional techniques described above is based on an assumption that charge is made to profit the administrators of any device that is operated and the external server.

Consider such a charging system in a multi-vendor device environment as a mixture of devices of different vendors in which a plurality of devices are made to cooperate using a cooperating function that causes the devices to cooperate. In this case, when the devices include a device of a first vendor that provides the cooperating function and a device of a second vendor different from the first vendor, charge for a function executed by the device of the second vendor is made to profit the second vendor. By contrast, charge for the use of the cooperating function, which is provided by the first vendor, by the device of the second vendor is not made to profit the first vendor, resulting in lost profits of the first vendor. For example, each device is only configured to count and store the number of executions of processing such as printing performed by itself irrespective of lone operation or cooperation, so that charge processing is performed in accordance with usage. Such charge processing based on the number of executions of printing is made only to profit a device (the device of the second vendor) that performs printing processing in cooperation.

In view of the above-described conventional technology, there is a need to provide an information processing apparatus, a charge processing method, and a computer-readable recording medium having a computer program that can prevent generation of lost profits of a provider of a cooperating function of enabling a plurality of devices to cooperate.

SUMMARY OF THE INVENTION

It is an object of the present invention to at least partially solve the problems in the conventional technology.

Exemplary embodiments of the present invention, there is provided an information processing apparatus comprising: a provider identification information acquiring unit that acquires a piece of provider identification information for each of a plurality of devices that cooperatively execute a plurality of functions, based on a piece of device identification information of the device, the piece of provider identification information allowing identification of whether a provider of the device is a predetermined provider as a provider of a cooperating function; a determining unit that determines, based on pieces of the provider identification information, whether a non predetermined-provider device provided by a provider other than the predetermined provider exists among the devices; a charge processing unit that performs charge processing to profit the predetermined provider when the non predetermined-provider device exists; and a cooperation controlling unit that controls the devices to cooperatively execute the functions based on the cooperating function.

Exemplary embodiments of the present invention also provide a charge processing method comprising: acquiring a piece of provider identification information for each of a plurality of devices that cooperatively execute a plurality of functions, based on a piece of device identification information of the device, the piece of provider identification information allowing identification of whether a provider of the device is a predetermined provider as a provider of a cooperating function; determining whether a non predetermined-provider device provided by a provider other than the predetermined provider exists among the devices based on pieces of the provider identification information; performing charge processing to profit the predetermined provider when the non predetermined-provider device exists; and controlling the devices to cooperatively execute the functions based on the cooperating function.

Exemplary embodiments of the present invention also provide a non-transitory computer-readable recording medium that contains a computer program that causes a computer to execute: acquiring a piece of provider identification information for each of a plurality of devices that cooperatively execute a plurality of functions, based on device identification information of the device, the piece of provider identification information allowing identification of whether a provider of the device is a predetermined provider as a provider of a cooperating function; determining whether a non predetermined-provider device provided by a provider other than the predetermined provider exists among the devices based on pieces of the provider identification information; performing charge processing to profit the predetermined provider when the non predetermined-provider device exists; and controlling the devices to cooperatively execute the functions based on the cooperating function.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 illustrates an exemplary device information table according to the first embodiment;

FIG. 9 is a block diagram of an exemplary functional configuration of a server unit of a parent device in a charge processing system according to a second embodiment of the present invention;

FIG. 10 illustrates exemplary charge determination information according to the second embodiment;

FIG. 13 illustrates an exemplary device information table according to Modification 1;

FIG. 14 illustrates an exemplary device information table according to Modification 1;

FIG. 15 illustrates an exemplary device information table according to Modification 2 of the present invention;

FIG. 18 illustrates an exemplary device information table according to the third embodiment;

FIG. 20 illustrates an exemplary device information table according to Modification 3 of the present invention;

DETAILED DESCRIPTION OF THE PREFERRED EMBODIMENTS

Exemplary embodiments of an information processing apparatus, a charge processing method, and a computer-readable recording medium having a computer program according to the present invention are described below in detail with reference to the accompanying drawings.

First Embodiment

Figure 1:
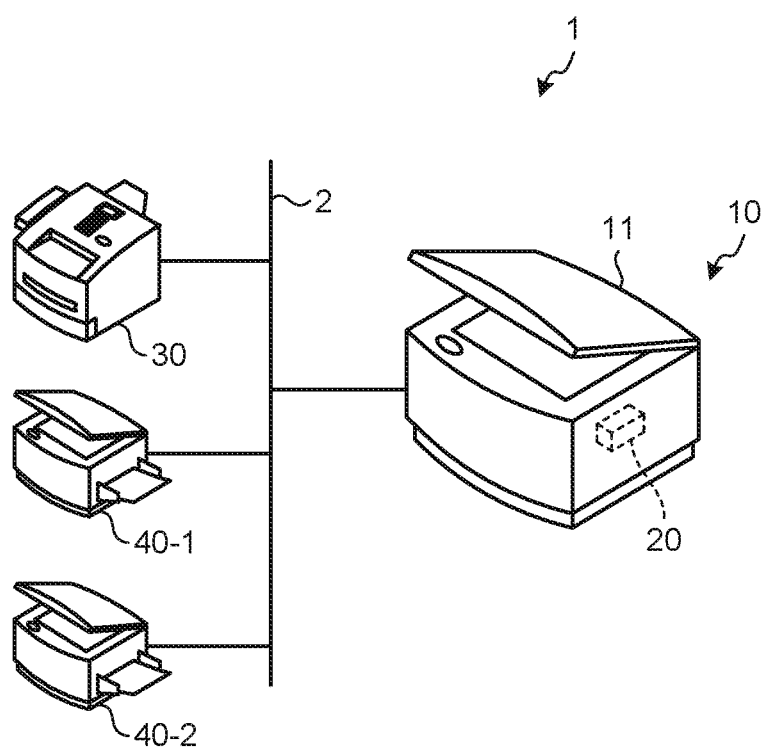
FIG. 1 is a pattern diagram of an exemplary charge processing system according to a first embodiment of the present invention.

FIG. 1 is a pattern diagram of an exemplary charge processing system 1 according to a first embodiment of the present invention. As illustrated in FIG. 1, the charge processing system 1 includes a parent device 10, a child device 30, and child devices 40-1 and 40-2. The parent device 10, the child device 30, and the child devices 40-1 and 40-2 are connected through a network 2. Examples of the network 2 include a local area network (LAN) and the Internet.

In the following description, when not need to be distinguished, the child devices 40-1 and 40-2 may be simply referred to as the child device 40. Although FIG. 1 illustrates an example including three child devices, the number of child devices is not limited thereto and may be any number equal to or larger than one.

The child devices 30 and 40 may be each, but are not limited to, image forming devices such as a printing device, a copier, a multifunction peripheral (MFP), a scanner device, or a facsimile device, and may also be each a device other than image forming devices, such as a projector or a camera. The first embodiment describes an example in which the child device 30 is a printing device and the child devices 40-1 and 40-2 are multifunction peripherals, but the present invention is not limited thereto.

The parent device 10 may be, but is not limited to, an image forming device such as a printing device, a copier, a multifunction peripheral, a scanner device, or a facsimile device, and may also be a device other than an image forming device, such as a projector or a camera. The first embodiment describes an example in which the parent device 10 is a scanner device, but the present invention is not limited thereto.

In the first embodiment, the parent device 10 includes a main unit 11 and a server unit 20 (an exemplary information processing apparatus). The main unit 11 has a configuration that enables the parent device 10 to function as a scanner device (image forming device), and the main unit 11 executes an operation of the parent device 10 as a scanner device (image forming device).

The first embodiment assumes that the server unit 20 is a small server having a board shape and is included in the parent device 10 and internally connected with the main unit 11, but the present invention is not limited thereto. The server unit 20 only needs to be connected with the main unit 11, and may be internally or externally connected with the main unit 11.

The server unit 20 has a cooperating function that causes at least two of the main unit 11, the child device 30, and the child devices 40-1 and 40-2 to cooperatively execute one or more functions of each device. Thus, the first embodiment can achieve a function that otherwise cannot be achieved by each device alone, or can achieve distributed execution of an identical function over a plurality of devices.

Figure 2:
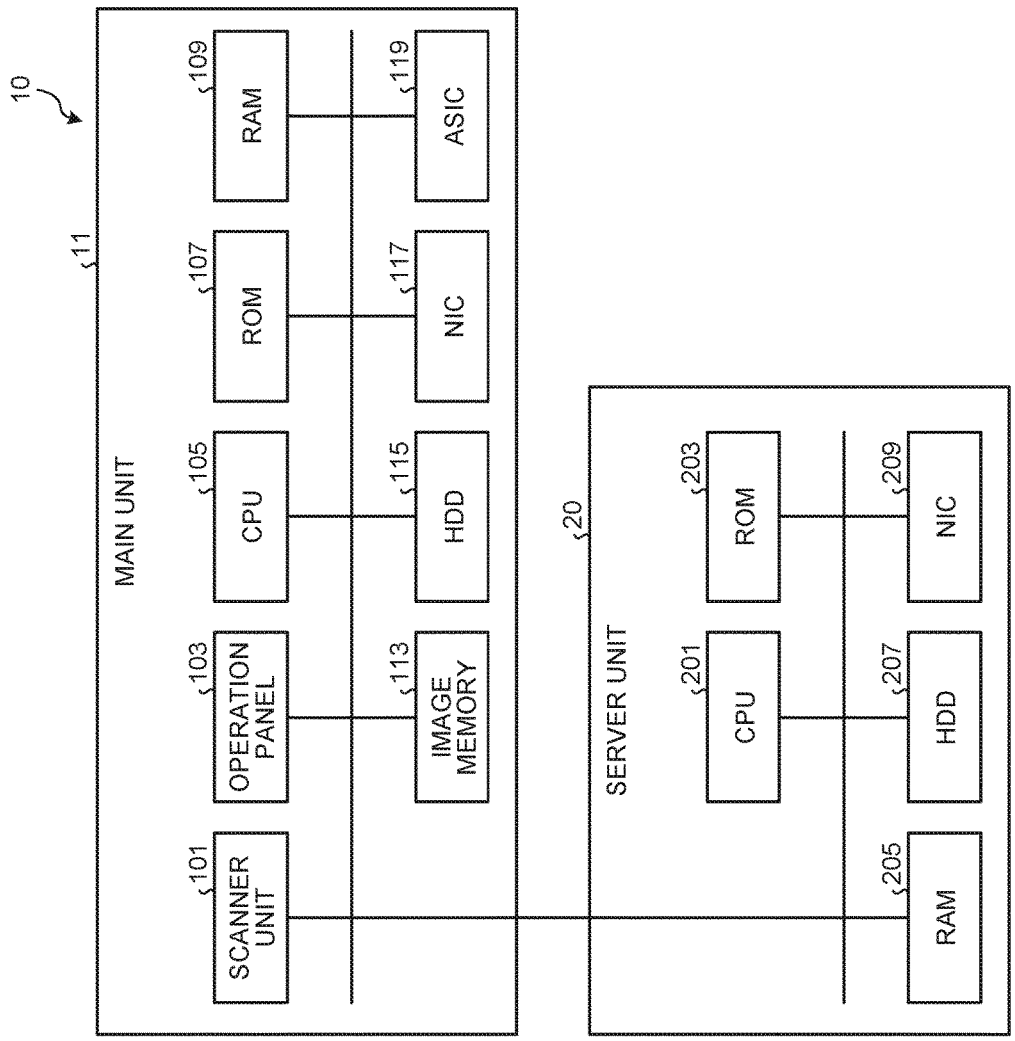
FIG. 2 is a block diagram of an exemplary hardware configuration of a parent device according to the first embodiment.

FIG. 2 is a block diagram of an exemplary hardware configuration of the parent device 10 according to the first embodiment. As illustrated in FIG. 2, the main unit 11 and the server unit 20 of the parent device 10 are connected through a bus. The main unit 11 includes a scanner unit 101, an operation panel 103, a central processing unit (CPU) 105, a read only memory (ROM) 107, a random access memory (RAM) 109, an image memory 113, a hard disk drive (HDD) 115, a network interface controller (NIC) 117, and an application specific integrated circuit (ASIC) 119. The server unit 20 includes a CPU 201, a ROM 203, a RAM 205, a HDD 207, and a NIC 209. The hardware configuration of the parent device 10 illustrated in FIG. 2 is an example and the present invention is not limited thereto.

The scanner unit 101 electrically reads a document placed on a platen to generate image data. The ASIC 119 provides various kinds of image processing on the image data read by the scanner unit 101. The image memory 113 stores therein the image data subjected to the image processing by the ASIC 119.

The NIC 117 is a communication interface for communication through the network 2. The operation panel 103 includes a liquid crystal display (LCD) that displays a screen, a light emitting diode (LED) that indicates the state of the parent device 10, a buzzer, hard keys, and a touch panel. The operation panel 103 displays various kinds of information on the LCD and receives various kinds of information input through the hard keys and the touch panel.

The ROM 107 stores therein, for example, a computer program executed by the CPU 105. The RAM 109 is used as a working area of the CPU 105. The HDD 115 stores therein various kinds of data used by the CPU 105, and image data subjected to various kinds of image processing by the ASIC 119. The CPU 105 executes a computer program stored in the ROM 107 on the RAM 109, and controls, for example, the scanner unit 101, the operation panel 103, the image memory 113, the HDD 115, the NIC 117, and the ASIC 119 that are connected with each other through a bus. The CPU 105 may provide various kinds of image processing on image data read by the scanner unit 101.

The NIC 209 is a communication interface for communication through the network 2. The ROM 203 stores therein, for example, a computer program executed by the CPU 201. The RAM 205 is used as the working area of the CPU 201. The HDD 207 stores therein various kinds of data used by the CPU 201. The CPU 201 executes a computer program stored in the ROM 203 on the RAM 205 to achieve a cooperating function.

Figure 3:
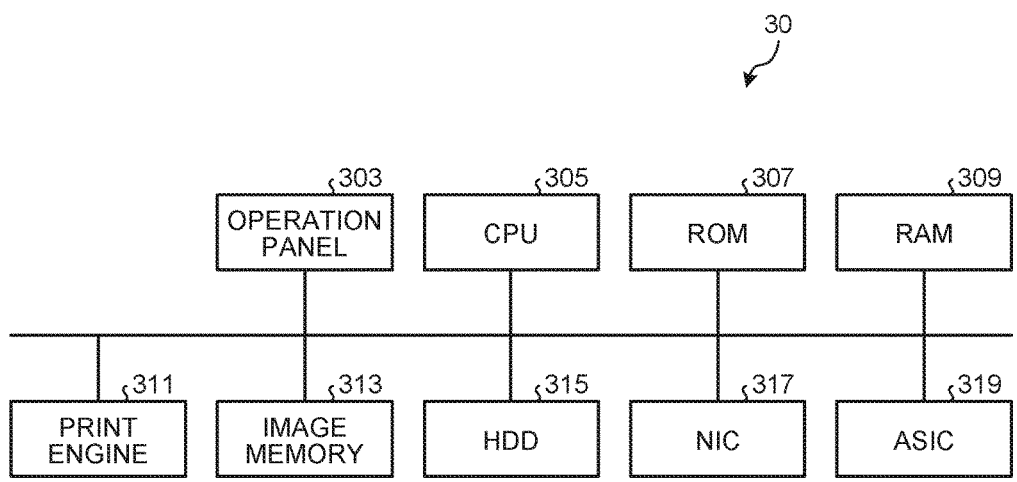
FIG. 3 is a block diagram of an exemplary hardware configuration of a child device according to the first embodiment.

FIG. 3 is a block diagram of an exemplary hardware configuration of the child device 30 according to the first embodiment. As illustrated in FIG. 3, the child device 30 includes an operation panel 303, a CPU 305, a ROM 307, a RAM 309, a print engine 311, an image memory 313, a HDD 315, a NIC 317, and an ASIC 319. The hardware configuration of the child device 30 illustrated in FIG. 3 is an example, and the present invention is not limited thereto.

The print engine 311 outputs image data for printing. The image data output for printing from the print engine 311 is subjected to various kinds of image processing. The image memory 313 stores therein image data output for printing from the print engine 311.

The NIC 317 is a communication interface for communication through the network 2. The operation panel 303 includes a liquid crystal display (LCD) that displays a screen, a light emitting diode (LED) that indicates the state of the child device 30, a buzzer, hard keys, and a touch panel. The operation panel 103 displays various kinds of information on the LCD and receives various kinds of information input through the hard keys and the touch panel.

The ROM 307 stores therein, for example, a computer program executed by the CPU 305. The RAM 309 is used as a working area of the CPU 305. The HDD 315 stores therein various kinds of data used by the CPU 305 and image data output for printing from the print engine 311. The CPU 305 executes a computer program stored in the ROM 307 on the RAM 309 and controls, for example, the operation panel 303, the print engine 311, the image memory 313, the HDD 315, the NIC 317, and the ASIC 319 that are connected through a bus. The CPU 305 may provide various kinds of image processing on image data output for printing from the print engine 311.

Figure 4:
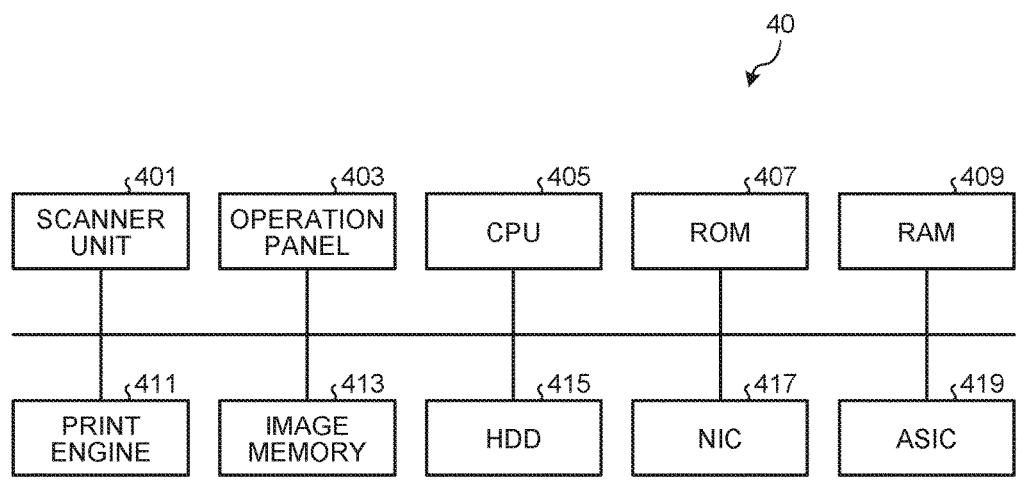
FIG. 4 is a block diagram of an exemplary hardware configuration of another child device according to the first embodiment.

FIG. 4 is a block diagram of an exemplary hardware configuration of the child device 40 according to the first embodiment. As illustrated in FIG. 4, the child device 40 includes a scanner unit 401, an operation panel 403, a CPU 405, a ROM 407, a RAM 409, a print engine 411, an image memory 413, a HDD 415, a NIC 417, and an ASIC 419. The hardware configuration of the child device 40 illustrated in FIG. 4 is an example, and the present invention is not limited thereto.

The scanner unit 401 electrically reads a document placed on the platen to generate image data. The print engine 411 outputs image data for printing. The ASIC 419 provides various kinds of image processing on the image data read by the scanner unit 401, and provides various kinds of image processing on image data output for printing from the print engine 411. The image memory 413 stores therein image data read by the scanner unit 401 and image data output for printing from the print engine 411.

The NIC 417 is a communication interface for communication through the network 2. The operation panel 403 includes a liquid crystal display (LCD) that displays a screen, a light emitting diode (LED) that indicates the state of the child device 40, a buzzer, hard keys, and a touch panel. The operation panel 403 displays various kinds of information on the LCD and receives various kinds of information input through the hard keys and the touch panel.

The ROM 407 stores therein, for example, a computer program executed by the CPU 405. The RAM 409 is used as a working area of the CPU 405. The HDD 415 stores therein various kinds of data used by the CPU 405, and image data read by the scanner unit 401 and image data output for printing from the print engine 411. The CPU 405 executes a computer program stored in the ROM 407 on the RAM 409 and controls, for example, the scanner unit 401, the operation panel 403, the print engine 411, the image memory 413, the HDD 415, the NIC 417, and the ASIC 419 that are connected through a bus. The CPU 405 may provide various kinds of image processing on image data read by the scanner unit 401, and provide various kinds of image processing on image data output for printing from the print engine 411.

The following describes an example in which the main unit 11 and the child device 30 perform a copying operation through cooperation of a document reading function (image generating function) of the main unit 11 and a printing function of the child device 30, but the present invention is not limited thereto. As described above, the present invention is applicable to any operation that causes at least two of the main unit 11, the child device 30, and the child devices 40-1 and 40-2 to cooperatively execute a one or more function of each device.

The following describes an exemplary multi-vendor device environment in which the vendor of the parent device 10 is Company R, and the vendor of the child device 30 is Company α, but the present invention is not limited thereto. Since the vendor of the parent device 10 is Company R, a vendor that provides a cooperating function of the server unit 20 is Company R.

Figure 5:
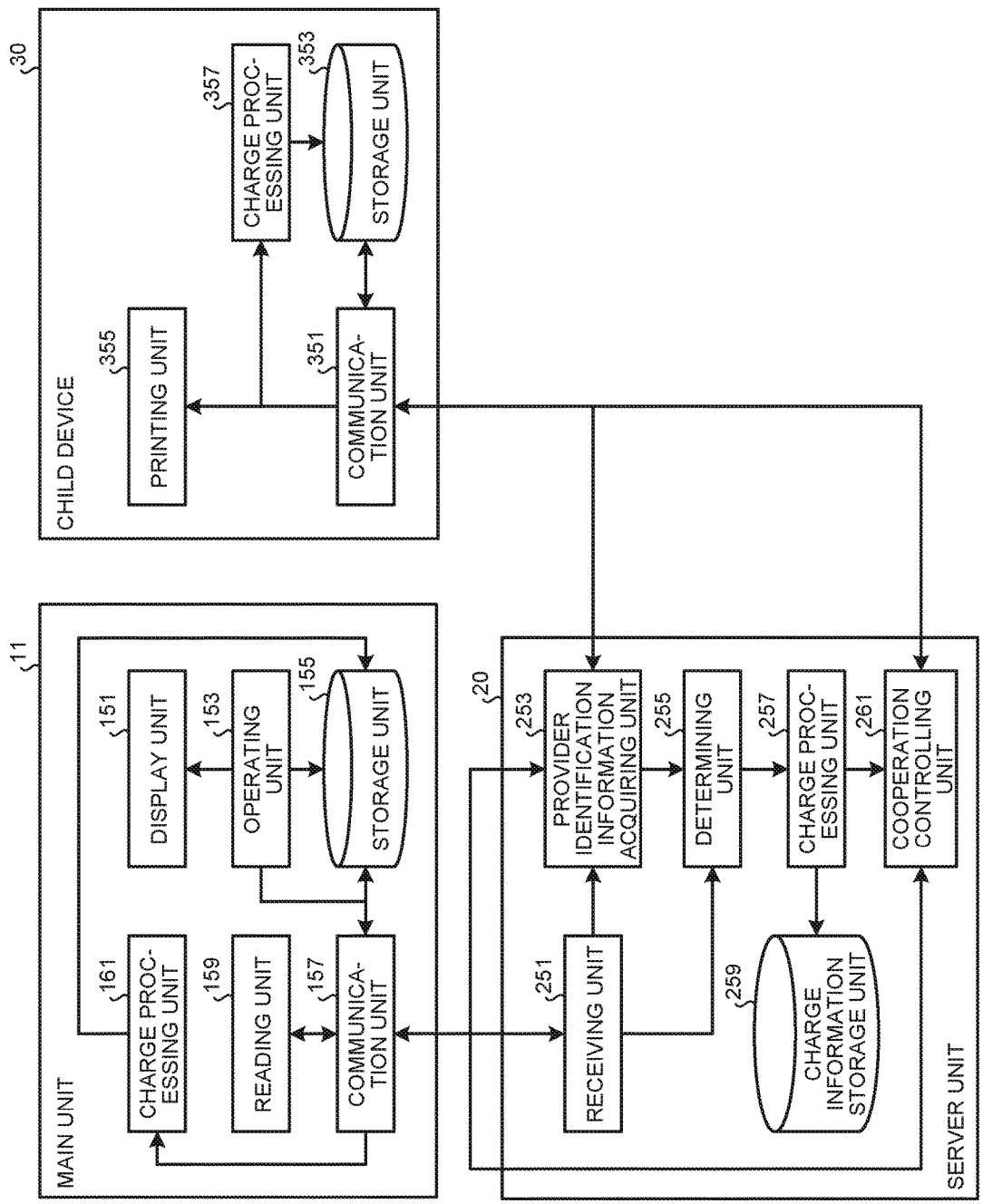
FIG. 5 is a block diagram of an exemplary functional configuration of a main unit, a server unit, and the child device according to the first embodiment.

FIG. 5 is a block diagram of an exemplary functional configuration of the main unit 11, the server unit 20, and the child device 30 according to the first embodiment. As illustrated in FIG. 5, the main unit 11 includes a display unit 151, an operating unit 153, a storage unit 155, a communication unit 157, a reading unit 159, and a charge processing unit 161. The main unit 11 is not limited to this functional configuration.

The display unit 151 and the operating unit 153 can be achieved by, for example, the operation panel 103, the CPU 105, and the RAM 109. The storage unit 155 can be achieved by, for example, the HDD 115. The communication unit 157 can be achieved by, for example, the CPU 105, the RAM 109, and the NIC 117. The reading unit 159 can be achieved by, for example, the scanner unit 101, the CPU 105, the RAM 109, and the image memory 113. The charge processing unit 161 can be achieved by, for example, the CPU 105, and the RAM 109.

As illustrated in FIG. 5, the server unit 20 includes a receiving unit 251, a provider identification information acquiring unit 253, a determining unit 255, a charge processing unit 257, a charge information storage unit 259, and a cooperation controlling unit 261.

The receiving unit 251, the provider identification information acquiring unit 253, and the cooperation controlling unit 261 can be achieved by, for example, the CPU 201, the RAM 205, and the NIC 209. The determining unit 255 and the charge processing unit 257 can be achieved by, for example, the CPU 201 and the RAM 205. The charge information storage unit 259 can be achieved by, for example, the HDD 207.

As illustrated in FIG. 5, the child device 30 includes a communication unit 351, a storage unit 353, a printing unit 355, and a charge processing unit 357. The child device 30 is not limited thereto this functional configuration.

The communication unit 351 can be achieved by, for example, the CPU 305, the RAM 309, and the NIC 317. The storage unit 353 can be achieved by, for example, the HDD 315. The printing unit 355 can be achieved by, for example, the CPU 305, the RAM 309, the print engine 311, and the image memory 313. The charge processing unit 357 can be achieved by, for example, the CPU 305 and the RAM 309.

In the following, the main unit 11 will be first described.

The display unit 151 displays a menu screen to use the cooperating function of the server unit 20. The operating unit 153 allows, on the menu screen, selection of a plurality of devices to cooperate and a function to be executed by each device, and pressing of a start button.

The first embodiment describes an example in which the main unit 11 and the child device 30 are selected and the document reading function of the main unit 11 and the printing function of the child device 30 are selected to perform the copying operation through cooperation of the main unit 11 and the child device 30 as described above, but the present invention is not limited thereto.

The communication unit 157 transmits a cooperation execution request to the server unit 20. In the first embodiment, the cooperation execution request includes device identification information that identifies the main unit 11, function identification information that identifies a document reading function associated with this device identification information, device identification information that identifies the child device 30, and function identification information that identifies a printing function associated with this device identification information, but the present invention is not limited thereto.

Examples of device identification information include an IP address, and examples of function identification information include a function ID. For example, upon selection of the main unit 11, the child device 30, the document reading function of the main unit 11, and the printing function of the child device 30 through the operating unit 153, the communication unit 157 acquires, from the storage unit 155, the device identification information of the main unit 11, the device identification information of the child device 30, the function identification information of the document reading function, and the function identification information of the printing function.

Upon a request, from the server unit 20, to acquire provider identification information allowing identification of whether the provider of the main unit 11 is a predetermined provider as the provider of the cooperating function, the communication unit 157 acquires the provider identification information of the main unit 11 from the storage unit 155, and replies this information to the server unit 20.

The first embodiment describes an example in which a provider is a vendor, and provider identification information is vendor information indicating a vendor, but the present invention is not limited thereto. For example, when Simple Network Management Protocol (SNMP) is used as a communication protocol to acquire provider identification information, Management Information Base (MIB) may be used as provider identification information. In the first embodiment, since the vendor of the parent device 10 is Company R as described above, the provider identification information of the main unit 11 indicates Company R, and the predetermined provider is Company R.

When the communication unit 157 receives an execution instruction of the document reading function from the server unit 20, the reading unit 159 electrically reads a document that is a scan target to generate image data, and the communication unit 157 transmits the image data thus generated to the server unit 20.

When the communication unit 157 receives an execution instruction of the document reading function from the server unit 20, the charge processing unit 161 performs charge processing if the document reading function is a function to be charged, and stores (records) charge information in the storage unit 155. In the first embodiment, since the document reading function is not to be charged, the charge processing is not to be performed. The charge processing is an operation of charge information to be used when, for example, the user of a device is charged later. The charge information includes, for example, charge amount information indicating a charge amount, charge date information indicating a charge date, and function identification information of an executed function in association with one another, but is not limited thereto. The charge information may be information that is aggregated by a serviceman and an aggregation system to be used later for charging, such as the number of printed sheets and the number of operations performed.

The charge processing performed by the charge processing unit 161 of the main unit 11 when a function is executed is normal charge processing performed to profit the vendor of a device that executes the function, and is different from the charge processing performed by the server unit 20 for the use of the cooperating function.

The following describes the server unit 20.

The receiving unit 251 receives device identification information of each of a plurality of devices that cooperatively execute a plurality of functions. The receiving unit 251 further receives, for each piece of device identification information, function identification information of a function executed by a device indicated by the device identification information.

In the first embodiment, the receiving unit 251 receives the cooperation execution request that includes the device identification information of the main unit 11, the function identification information of the document reading function associated with the device identification information, the device identification information of the child device 30, and the function identification information of the printing function associated with the device identification information.

The provider identification information acquiring unit 253 acquires a piece of provider identification information for each device based on a plurality of pieces of device identification information received by the receiving unit 251. In the first embodiment, the provider identification information acquiring unit 253 acquires the provider identification information of the main unit 11 from the main unit 11 based on the device identification information of the main unit 11 included in the cooperation execution request received by the receiving unit 251, and acquires the provider identification information of the child device 30 from the child device 30 based on the device identification information of the child device 30 included in the cooperation execution request.

In the first embodiment, as described above, the provider identification information of the main unit 11 indicates Company R, and the vendor of the child device 30 is Company α, and thus the provider identification information of the child device 30 indicates Company α.

The determining unit 255 determines whether a non predetermined-provider device provided by a provider other than the predetermined provider exists among the devices based on the pieces of provider identification information acquired by the provider identification information acquiring unit 253.

In the first embodiment, as illustrated in FIG. 6, the determining unit 255 generates a device information table as a record including the device identification information, the provider identification information, and the function identification information of each of the main unit 11 and the child device 30, which are associated using the device identification information as a key, and sequentially determines whether the provider identification information in the record indicates a provider other than the predetermined provider. If the provider identification information indicates a provider other than the predetermined provider, it is determined that a device indicated by the device identification information associated with the provider identification information is a non predetermined-provider device provided by the provider other than the predetermined provider and the non predetermined-provider device exists.

In the example illustrated in FIG. 6, the device identification information (IP address) "AA.AA.AA.AA" indicates the main unit 11, and the device identification information (IP address) "BB.BB.BB.BB" indicates the child device 30. Thus, since the provider identification information in the record in the second row is not Company R as the predetermined provider but is Company α, the determining unit 255 determines that the child device 30 is a non predetermined-provider device and the non predetermined-provider device exists.

If the determining unit 255 determines that the non predetermined-provider device exists, the charge processing unit 257 performs the charge processing on the predetermined provider and stores (records) the charge information in the charge information storage unit 259. The charge information is, for example, information including the charge amount information indicating the charge amount, the charge date information indicating the charge date, the device identification information of the non predetermined-provider device, and the function identification information of the non predetermined-provider device in association with one another, but the present invention is not limited thereto. In the example illustrated in FIG. 6, the child device 30 is the non predetermined-provider device, the charge processing on Company R as the predetermined provider is performed.

The charge processing performed by the charge processing unit 257 of the server unit 20 is additional charge processing performed to profit a vendor that provides the cooperating function, when a device of a vendor other than the vendor that provides the cooperating function executes a function using the cooperating function. In the first embodiment, this additional charge processing is not performed when the device of the vendor that provides the cooperating function executes a function using the cooperating function.

In the first embodiment, this additional charge processing can prevent such a case that, when a device of Company α executes a function using a cooperating function provided by Company R, no charge is made to profit Company R, resulting in lost profits of Company R.

The cooperation controlling unit 261 controls a plurality of devices to cooperatively execute a plurality of functions based on the cooperating function. In the first embodiment, the cooperation controlling unit 261 instructs the main unit 11 to read a document, based on the device identification information of the main unit 11 and the function identification information of the document reading function associated with the device identification information included in the cooperation execution request received by the receiving unit 251, and acquires an image data thus generated by this document reading from the main unit 11. The cooperation controlling unit 261 further instructs the child device 30 to print the acquired image data based on the device identification information of the child device 30 included in the cooperation execution request and the function identification information of the printing function associated with the device identification information received by the receiving unit 251.

Accordingly, the child device 30 prints the image data, which completes the copying operation through cooperation of the document reading function of the main unit 11 and the printing function of the child device 30.

The following describes the child device 30.

Having been requested to acquire provider identification information from the server unit 20, the communication unit 351 acquires the provider identification information of the child device 30 from the storage unit 353, and replies this information to the server unit 20. In the first embodiment, since the vendor of the child device 30 is Company α as described above, the provider identification information of the child device 30 indicates Company α.

When the communication unit 351 receives an instruction to execute the printing function including image data to be printed from the server unit 20, the printing unit 355 prints this image data to be printed. This completes the copying operation through cooperation of the document reading function of the main unit 11 and the printing function of the child device 30.

When the communication unit 351 receives an instruction to execute the printing function from the server unit 20, the charge processing unit 357 performs charge processing if the printing function is a function to be charged, and stores (records) the charge information in the storage unit 353.

Examples of the charge information include the charge amount information indicating the charge amount, the charge date information indicating the charge date, and the function identification information of the function thus executed in association with one another, but the present invention is not limited thereto.

Similarly to the charge processing performed by the main unit 11, the charge processing performed by the charge processing unit 357 of the child device 30 when a function is executed is normal charge processing performed to profit the vendor of a device that executes the function, and is different from the charge processing performed by the server unit 20 for the use of the cooperating function.

Figure 7:
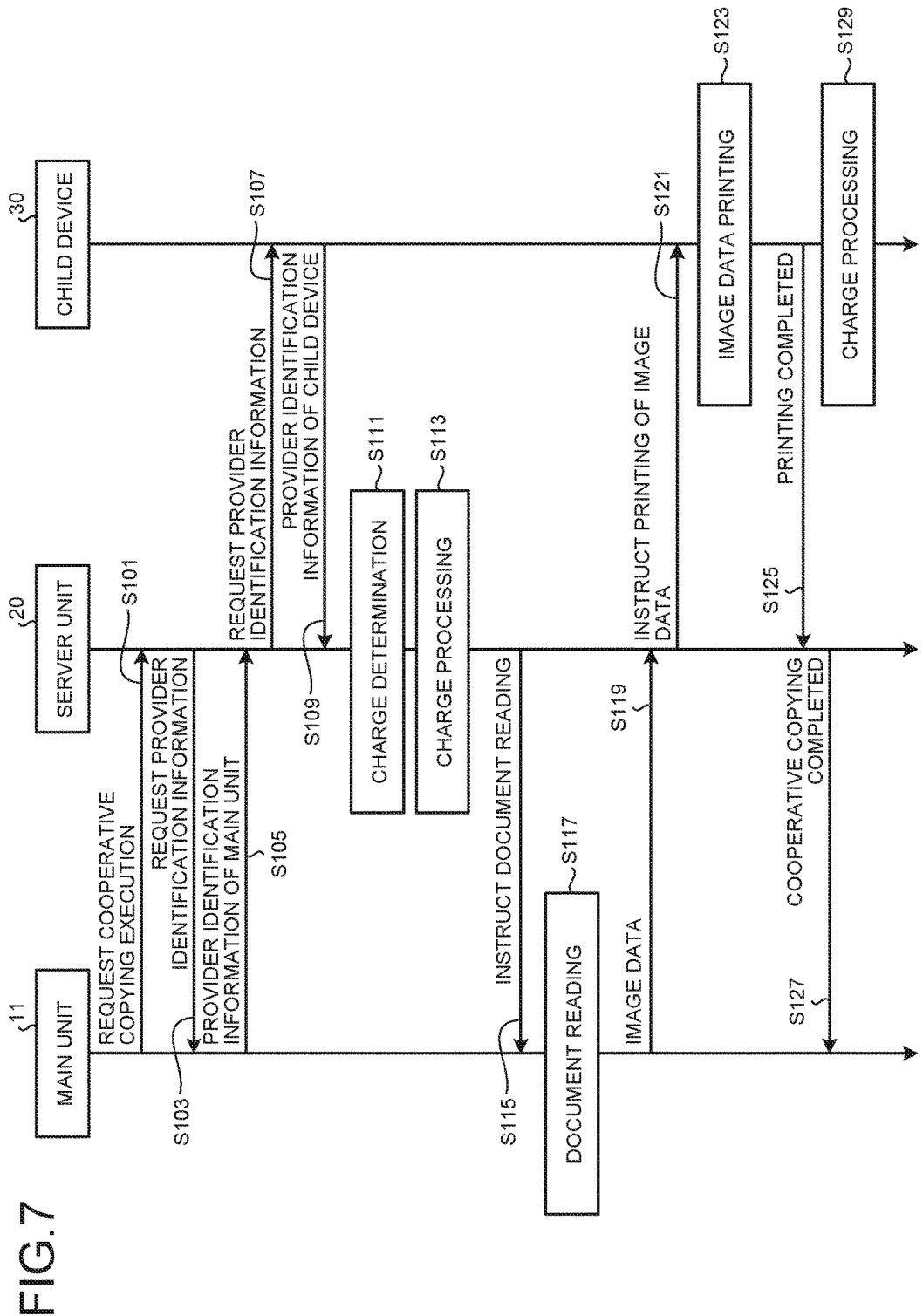
FIG. 7 is a sequence diagram of an exemplary copying operation as cooperation of a document reading function of the main unit and a printing function of the child device according to the first embodiment.

FIG. 7 is a sequence diagram of an exemplary copying operation through cooperation of the document reading function of the main unit 11 and the printing function of the child device 30 according to the first embodiment.

First, the communication unit 157 transmits, to the server unit 20, the cooperation execution request including the device identification information of the main unit 11, the function identification information of the document reading function associated with the device identification information, the device identification information of the child device 30, and the function identification information of the printing function associated with the device identification information (step S101).

Subsequently, the provider identification information acquiring unit 253 acquires the provider identification information of the main unit 11 from the main unit 11 based on the device identification information of the main unit 11 included in the cooperation execution request received by the receiving unit 251 (steps S103 and S105), and acquires the provider identification information of the child device 30 from the child device 30 based on the device identification information of the child device 30 included in the cooperation execution request (steps S107 and S109).

Subsequently, as illustrated in FIG. 6, the determining unit 255 generates the device information table as a record including the device identification information, the provider identification information, and the function identification information of each of the main unit 11 and the child device 30 by using the device identification information as a key in association with one another, and performs charge determination processing to determine whether a non predetermined-provider device exists using the device information table thus generated (step S111).

Subsequently, if the determining unit 255 determines that a non predetermined-provider device exists, the charge processing unit 257 performs charge processing to profit the predetermined provider and stores the charge information in the charge information storage unit 259 (step S113). If the determining unit 255 does not determine that a non predetermined-provider device exists, the processing at step S113 is not performed.

Subsequently, the cooperation controlling unit 261 instructs the main unit 11 to read a document, based on the device identification information of the main unit 11 and the function identification information of the document reading function associated with the device identification information included in the cooperation execution request received by the receiving unit 251 (step S115). Accordingly, the reading unit 159 electrically reads the document to be scanned to generate image data (step S117), and the cooperation controlling unit 261 acquires this image data from the main unit 11 (step S119).

Subsequently, the cooperation controlling unit 261 instructs the child device 30 to print the image data thus acquired based on the device identification information of the child device 30 included in the cooperation execution request received by the receiving unit 251 and the function identification information of the printing function associated with the device identification information (step S121). Accordingly, the printing unit 355 prints the image data to be printed (step S123), and then the cooperation controlling unit 261 receives a printing completion notification from the child device 30 (step S125) and notifies the main unit 11 of completion of the copying operation (cooperative copying) through cooperation of the document reading function of the main unit 11 and the printing function of the child device 30 (step S127).

Subsequently, the charge processing unit 357 of the child device 30 performs charge processing for execution of the printing function, and stores charge information in the storage unit 353 (step S129).

Figure 8:
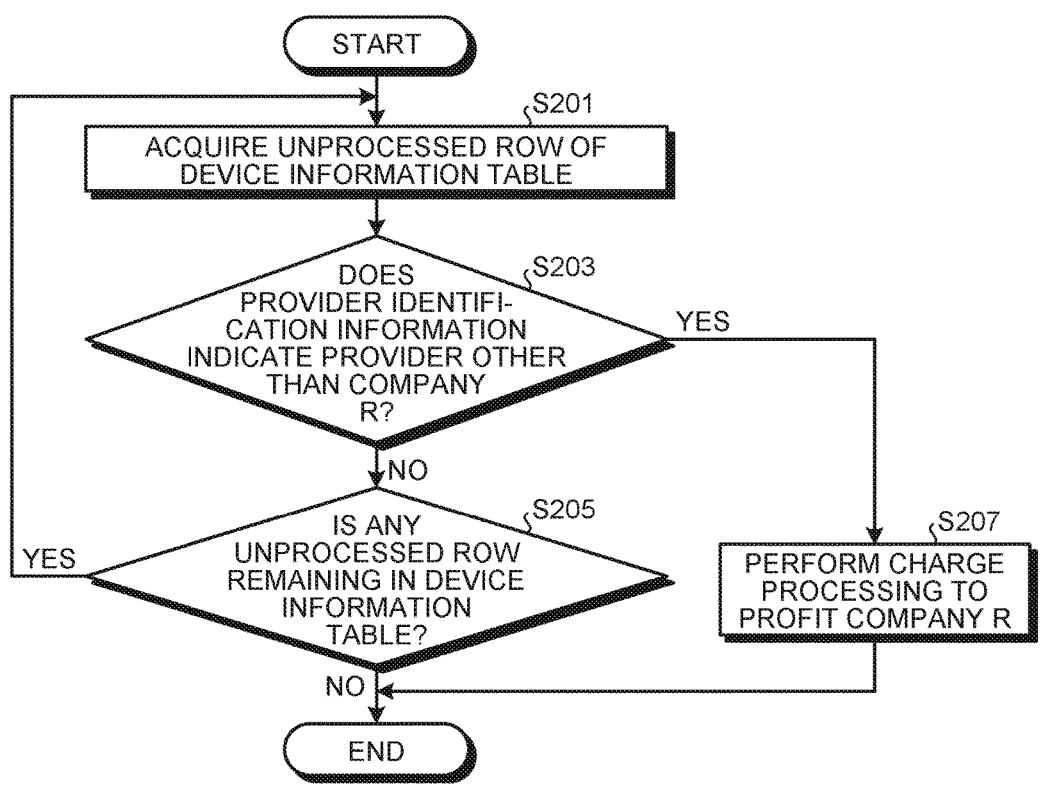
FIG. 8 is a flowchart of a detailed example of charge determination processing and charge processing according to the first embodiment.

FIG. 8 is a flowchart of a detailed example of the charge determination processing and the charge processing according to the first embodiment, indicating a detailed example of the processing at steps S111 and S113 of the sequence diagram illustrated in FIG. 7.

First, the determining unit 255 acquires a record in an unprocessed row in the device information table (refer to FIG. 6) as a record including the device identification information, the provider identification information, and the function identification information of each of the main unit 11 and the child device 30 in association with one another by using the device identification information as a key (step S201). In the first embodiment, a record in an unprocessed row is acquired in ascending order of the row number, but the present invention is not limited thereto.

Subsequently, the determining unit 255 determines whether the provider identification information in the record in the row thus acquired indicates a provider other than Company R as the predetermined provider (step S203).

With No at step S203, the process returns to step S201 if any record in an unprocessed row remains in the device information table (Yes at step S205), and the processing ends if no record in an unprocessed row remains in the device information table (No at step S205).

With Yes at step S203, the charge processing unit 257 performs charge processing to profit Company R as the predetermined provider (step S207), and the processing ends.

In a case of the device information table illustrated in FIG. 6, the charge processing to profit Company R is performed based on a result of determination on the record in the second row.

As described above, the first embodiment can prevent such a case that, when a device of Company α executes a function by using the cooperating function provided by Company R, no charge is made to profit Company R, resulting in lost profits of Company R. In other words, the first embodiment can prevent such a case that, when the cooperating function is provided by a provider company and a device of a third party executes a function using the cooperating function provided by the provider company, no charge is made to profit the provider company, resulting in lost profits of the provider company.

In the first embodiment, additional charge processing to profit Company R is performed when a device of Company α executes a function by using the cooperating function provided by Company R, but not performed when a device of Company R executes a function by using the cooperating function provided by Company R.

Accordingly, a higher charge amount is charged on the user when the device of the third party is used with a cooperating function provided by the provider company than when a device of the provider company is used. This provides the user with incentive to introduce a device of the provider company when the user expects the use of the cooperating function provided by the provider company, thereby facilitating introduce of the provider company device to the user environment.

Second Embodiment

A second embodiment of the present invention describes an example of determining whether each function is to be provided with charge processing. The following mainly describes a difference from the first embodiment, and a component having the same function as that in the first embodiment is denoted by the same name and reference sign as those in the first embodiment, with description thereof being omitted.

FIG. 9 is a block diagram of an exemplary functional configuration of a server unit 1020 of a parent device 1010 of the charge processing system 1001 according to the second embodiment. As illustrated in FIG. 9, the server unit 1020 according to the second embodiment differs from the server unit 20 in the first embodiment in that the server unit 1020 includes a determining unit 1255, a charge determination information storage unit 1263, and a charge determination information acquiring unit 1265. The charge determination information storage unit 1263 can achieved by, for example the HDD 207, and the charge determination information acquiring unit 1265 can achieved by, for example the CPU 201 and the RAM 205.

The charge determination information storage unit 1263 stores therein, for each piece of the function identification information, charge determination information associated with charge necessity information indicating whether a function indicated by the function identification information is to be charged. FIG. 10 illustrates exemplary charge determination information according to the second embodiment. In the example illustrated in FIG. 10, the document reading function is set not to be charged (not to be charged through additional charge processing), and the printing function is set to be charged (to be charged through additional charge processing). The second embodiment assumes that charge determination information is registered in the charge determination information storage unit 1263 in advance, but the present invention is not limited thereto.

The charge determination information acquiring unit 1265 acquires charge determination information from the charge determination information storage unit 1263.

The determining unit 1255 determines whether a plurality of devices include a non predetermined-provider device that executes a function to be charged based on the pieces of device identification information and the pieces of function identification information received by the receiving unit 251, the pieces of provider identification information acquired by the provider identification information acquiring unit 253, and charge determination information acquired by the charge determination information acquiring unit 1265.

In the second embodiment, as illustrated in FIG. 6, the determining unit 1255 generates the device information table as a record including the device identification information, the provider identification information, and the function identification information of each of the main unit 11 and the child device 30 in association with one another using the device identification information as a key, and sequentially determines whether provider identification information in the record indicates a provider other than the predetermined provider. If the provider identification information indicates a provider other than the predetermined provider, the determining unit 1255 further determines, using charge determination information, whether to charge a function indicated by function identification information associated with the provider identification information. If the function is determined to be charged, a device indicated by device identification information associated with the provider identification information is a non predetermined-provider device that executes a function to be charged, and it is determined that the non predetermined-provider device that executes a function to be charged exists.

In the example illustrated in FIG. 6, since the provider identification information in the record in the second row indicates not Company R as the predetermined provider but Company α and the printing function is to be charged (refer to FIG. 10), the child device 30 is a non predetermined-provider device that executes a function to be charged, and the determining unit 1255 determines that the non predetermined-provider device that executes a function to be charged exists.

If the determining unit 1255 determines that the non predetermined-provider device that executes a function to be charged exists, the charge processing unit 257 performs charge processing to profit the predetermined provider.

Figures 11, 12:
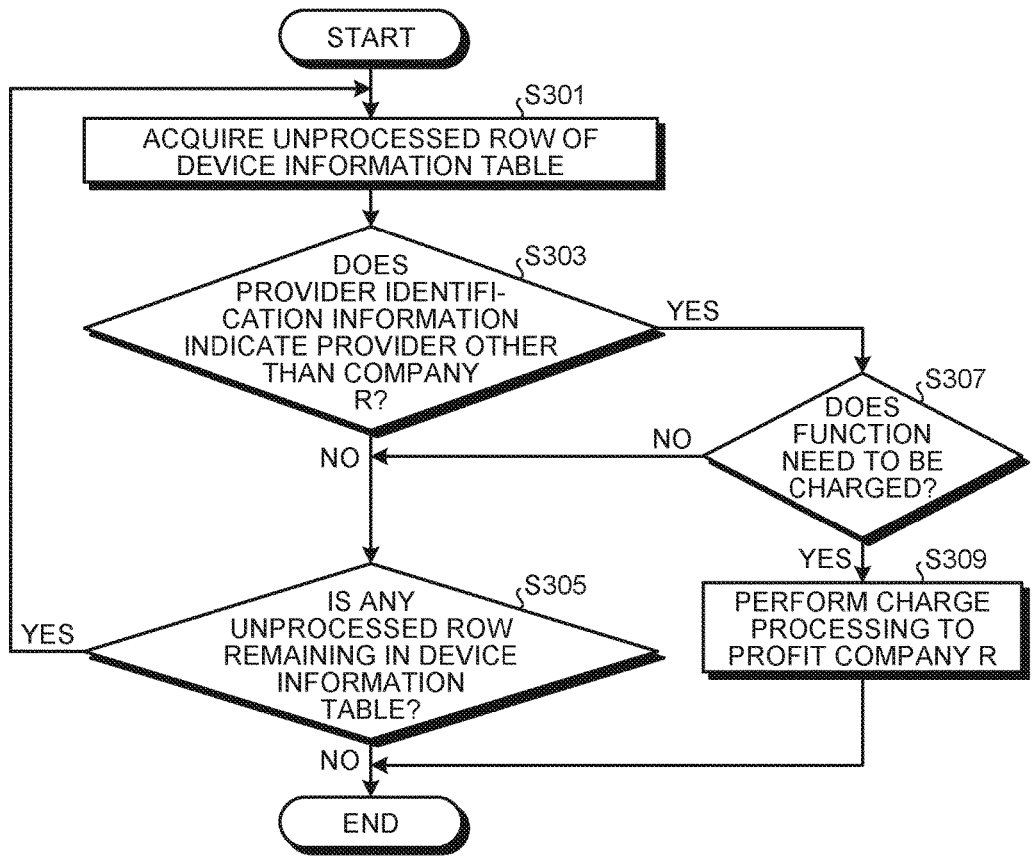
FIG. 11 is a flowchart of a detailed example of charge determination processing and charge processing according to the second embodiment.
FIG. 12 illustrates exemplary charge determination information according to Modification 1 of the present invention.

FIG. 11 is a flowchart of a detailed example of the charge determination processing and the charge processing according to the second embodiment.

Processing from steps S301 to S305 is the same as the processing from steps S201 to S205 of the flowchart illustrated in FIG. 8.

With Yes at step S303, the determining unit 1255 uses charge determination information acquired by the charge determination information acquiring unit 1265 to determine whether to charge a function indicated by function identification information as a record in the row thus acquired (step S307).

With No at step S307, the process proceeds to step S305. With Yes at step S307, the charge processing unit 257 performs charge processing to profit Company R as the predetermined provider (step S309), and the processing ends.

In a case of the device information table illustrated in FIG. 6 and the charge determination information illustrated in FIG. 10, the charge processing to profit Company R is performed based on a result of determination on the record in the second row.

According to the second embodiment, when the provider company provides the cooperating function and the device of the third party executes a function using the cooperating function provided by the provider company, additional charge processing to profit the provider company can be prevented from being performed in a case in which the function thus executed is not to be charged.

According to the second embodiment, when normal charge processing is to be performed for a function executed by a device of Company α, both of normal charge processing to profit Company α and additional charge processing to profit Company R are performed, so that the user is charged accordingly. However, the additional charge processing is not performed for a function of a device of Company R. Thus, when normal charge processing is to be performed for a function executed by a device of Company R, additional charge processing to profit Company R is not performed, and normal charge processing to profit Company R is performed, so that the user is charged accordingly.

Accordingly, a higher charge amount is charged on the user when the device of the third party is used with a cooperating function provided by the provider company than when the device of the provider company is used. This provides the user with incentive to introduce the device of the provider company when the user expects the use of the cooperating function provided by the provider company, thereby facilitating introduce the device of the provider company to the user environment.

Modification 1

In the second embodiment, additional charge processing may be performed with a charge amount in accordance with a function to be charged. In this case, in charge determination information, charge necessity information indicating that the function is to be charged is further associated with reference charge amount information indicating a reference charge amount for determining the charge amount of a function indicated by function identification information associated with this charge necessity information.

FIG. 12 illustrates exemplary charge determination information according to Modification 1. In the example illustrated in FIG. 12, a black-and-white printing function and a color printing function are set to be charged (to be charged through additional charge processing), the reference charge amount of the black-and-white printing function is set to 10 yen and the reference charge amount of the color printing function is set to 50 yen. The reference charge amount is assumed to be the same as the charge amount of a function charged through normal charge processing in a device of Company R as the predetermined provider, but the present invention is not limited thereto.

If the determining unit 1255 determines that a non predetermined-provider device that executes a function to be charged exists, the charge processing unit 257 determines the charge amount based on the reference charge amount indicated by the reference charge amount information associated with function identification information indicating the function, and performs charge processing to profit the predetermined provider.

In Modification 1, the charge amount is calculated to be base amount+(reference charge amount×contribution rate), but the present invention is not limited thereto. The base amount is a fixed use amount of the cooperating function, and the contribution rate is the contribution rate of the cooperating function when a function of the device of the third party is executed using the cooperating function. Information indicating the base amount and the contribution rate may be stored in the HDD 207 in advance, or may be defined in a computer program that achieves the cooperating function. The base amount is, for example, 1 yen, and the contribution rate is, for example, 0.1, but the present invention is not limited thereto.

On an assumption that the copying operation through cooperation of the document reading function of the main unit 11 and the black-and-white printing function of the child device 30, a device information table illustrated in FIG. 13 is obtained. In the device information table illustrated in FIG. 13 and the charge determination information illustrated in FIG. 12, according to the flowchart illustrated in FIG. 11, the charge processing to profit Company R is performed as a result of determination on the record in the second row. The charge amount in this case is 1+(10×0.1)=2 yen.

On an assumption that the copying operation through cooperation of the document reading function of the main unit 11 and the color printing function of the child device 30, a device information table illustrated in FIG. 14 is obtained.

In the device information table illustrated in FIG. 14 and the charge determination information illustrated in FIG. 12, according to the flowchart illustrated in FIG. 11, the charge processing to profit Company R is performed as a result of determination on the record in the second row. The charge amount in this case is 1+(50×0.1)=6 yen.

According to Modification 1, when the device of the third party executes a function using the cooperating function provided by the provider company, and thus additional charge processing to profit the provider company is performed, the charge processing can be performed with a charge amount in accordance with a function executed by the device of the third party.

Modification 2

The second embodiment describes an example in which charge determination information is registered in the charge determination information storage unit in advance, charge necessity information for each function may be stored in each device of the predetermined provider so that the server unit may collect charge necessity information of each function from each device of the predetermined provider and store charge necessity information associated with each pair of device identification information and function identification information as charge determination information in the charge determination information storage unit.

In Modification 2, among the parent device 1010, the child device 30, and the child devices 40-1 and 40-2, the parent device 1010 and the child device 40-1 are assumed to be devices of Company R as the predetermined provider. The child device 40-1 is a multifunction peripheral and thus has the document reading function and the printing function.

FIG. 15 illustrates exemplary charge determination information according to Modification 2. In the example illustrated in FIG. 15, the device identification information (IP address) "CC.CC.CC.CC" indicates the child device 40-1, and the document reading function is set not to be charged (not to be charged through additional charge processing) in each device, whereas the printing function is set to be charged (to be charged through additional charge processing) in the child device 40-1.

In Modification 2, device identification information of each device (a main unit 1011 and the child device 40-1) of Company R as the predetermined provider is stored in, for example, the HDD 207 in advance. The charge determination information acquiring unit 1265 acquires a pair of function identification information and charge necessity information for each function from each device (the main unit 1011 and the child device 40-1) of Company R based on the device identification information, and stores the pair as charge determination information in association with the device identification information in the charge determination information storage unit 1263.

Figure 16:
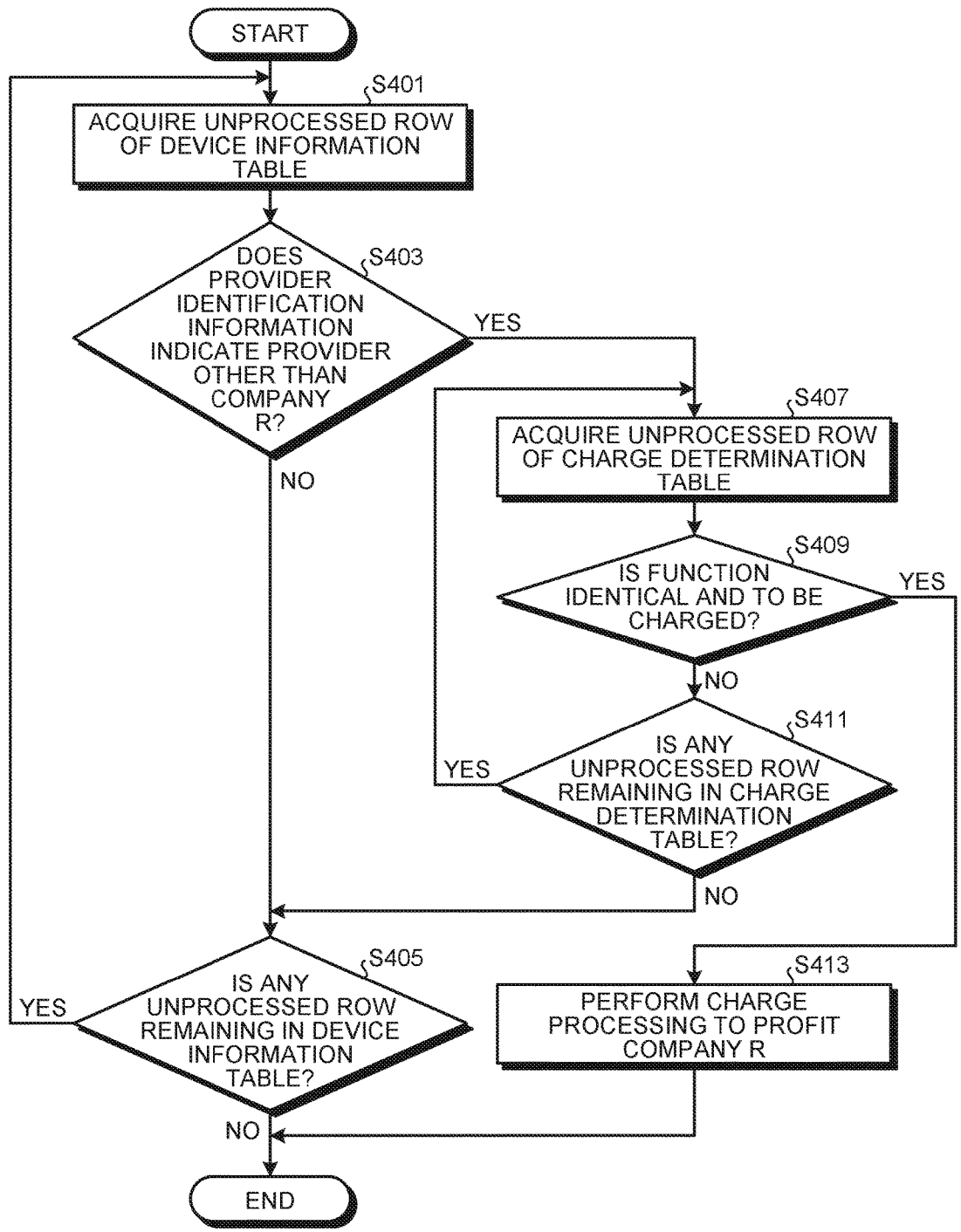
FIG. 16 is a flowchart of a detailed example of charge determination processing and charge processing according to Modification 2.

FIG. 16 is a flowchart of a detailed example of the charge determination processing and the charge processing according to Modification 2.

Processing from steps S401 to S405 is the same as the processing from steps S201 to S205 in the flowchart illustrated in FIG. 8.

With Yes at step S403, the determining unit 1255 acquires a record in an unprocessed row from a charge determination table (refer to FIG. 15) as charge determination information acquired by the charge determination information acquiring unit 1265 (step S407). In Modification 2, a record in an unprocessed row is acquired in ascending order of the row number, but the present invention is not limited thereto.

Subsequently, the determining unit 1255 determines whether the same function is indicated by function identification information between the record in the row acquired at step S401 and the record in the row acquired at step S407, and whether charge necessity information as a record in the row thus acquired at step S407 indicates "to be charged" (step S409).

With No at step S409, the process returns to step S407 if any record in an unprocessed row remains in the charge determination table (Yes at step S411), and the process proceeds to step S405 when no record in an unprocessed row remains in the charge determination table (No at step S411).

With Yes at step S409, the charge processing unit 257 performs charge processing to profit Company R as the predetermined provider (step S413), and the processing ends.

According to the device information table illustrated in FIG. 6 and charge determination information illustrated in FIG. 15, the charge processing to profit Company R is performed based on a result of determination on a record in the second row of the device information table and a record in the third row of the charge determination information.

Modification 2 can provide the same effect as that of the second embodiment.

Third Embodiment

A third embodiment of the present invention describes an example of determining whether to charge each function of each device of the predetermined provider depending on whether the function is at fault. The following mainly describes a difference from the first embodiment, and a component having the same function as that in the first embodiment is denoted by the same name and reference sign as those in the first embodiment, with description thereof being omitted.

Figure 17:
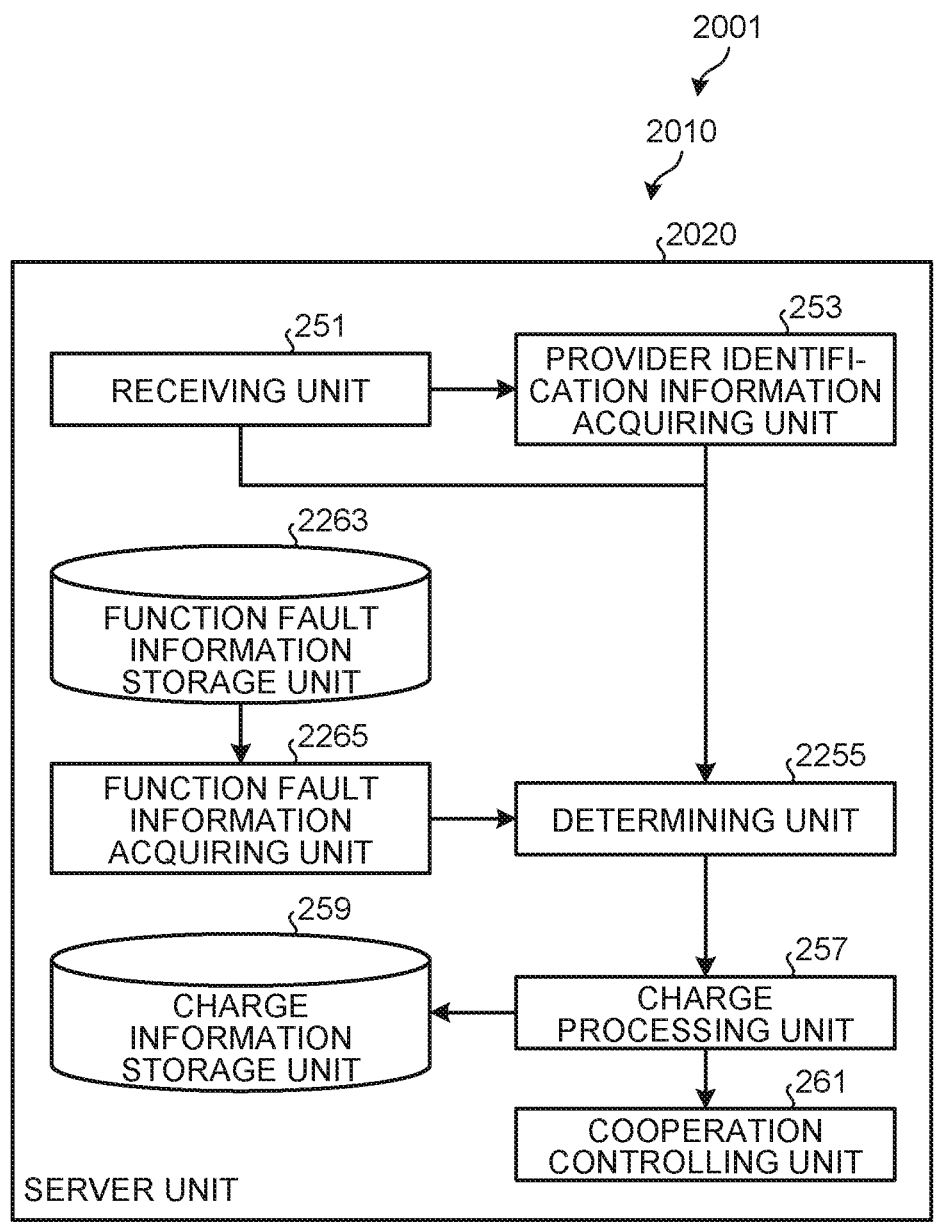
FIG. 17 is a block diagram of an exemplary functional configuration of a server unit of a parent device in a charge processing system according to a third embodiment of the present invention.

FIG. 17 is a block diagram of an exemplary functional configuration of a server unit 2020 of a parent device 2010 of a charge processing system 2001 according to the third embodiment. As illustrated in FIG. 17, the server unit 2020 according to the third embodiment differs from the server unit 20 in the first embodiment in that the server unit 2020 includes a determining unit 2255, a function fault information storage unit 2263, and a function fault information acquiring unit 2265. The function fault information storage unit 2263 can be achieved by, for example, the HDD 207, and the function fault information acquiring unit 2265 can be achieved by, for example, the CPU 201 and the RAM 205.

In the third embodiment, among the parent device 2010, the child device 30, and the child devices 40-1 and 40-2, the parent device 2010 and the child device 40-1 are assumed to be devices of Company R as the predetermined provider. The child device 40-1 is a multifunction peripheral and thus has the document reading function and the printing function.

The function fault information storage unit 2263 stores therein, for each pair of device identification information indicating a device of the predetermined provider and function identification information indicating a function of the device, fault occurrence information indicating whether the function of the device is at fault. In the third embodiment, each device of Company R as the predetermined provider manages fault occurrence information of each function, and the server unit collects the fault occurrence information of each function from each device of the predetermined provider and stores fault occurrence information associated with each pair of device identification information and function identification information as function fault information in the function fault information storage unit 2263.

Specifically, device identification information of each device (the main unit 11 and the child device 40-1) of Company R as the predetermined provider is stored in, for example, the HDD 207 in advance. The function fault information acquiring unit 2265 acquires a pair of function identification information and fault occurrence information for each function from each device (the main unit 11 and the child device 40-1) of Company R based on the device identification information, and stores the pair as function fault information in association with device identification information in the function fault information storage unit 2263. The present invention is not limited, and function fault information may be registered in the function fault information storage unit 2263 in advance.

FIG. 18 illustrates exemplary function fault information according to the third embodiment. In the example illustrated in FIG. 18, the device identification information (IP address) "CC.CC.CC.CC" indicates the child device 40-1, and the document reading function is set not to be at fault in each device, whereas the printing function is set to be at fault in the child device 40-1.

The function fault information acquiring unit 2265 acquires function fault information from the function fault information storage unit 2263.

The determining unit 2255 determines whether a plurality of devices include a non predetermined-provider device executing a function that is not at fault in any device of the predetermined provider based on the pieces of device identification information and the pieces of function identification information received by the receiving unit 251, the pieces of provider identification information acquired by the provider identification information acquiring unit 253, and the function fault information acquired by the function fault information acquiring unit 2265.

In the third embodiment, as illustrated in FIG. 6, the determining unit 2255 generates the device information table as a record including the device identification information, the provider identification information, and the function identification information of each of the main unit 11 and the child device 30 in association with one another using the device identification information as a key, and sequentially determines whether provider identification information in the record indicates a provider other than the predetermined provider. If the provider identification information indicates a provider other than the predetermined provider, the determining unit 2255 further determines, using function fault information, whether a function indicated by function identification information associated with the provider identification information is at fault. If the function is determined to be not at fault, a device indicated by the device identification information associated with the provider identification information is a non predetermined-provider device executing a function that is not at fault in any device of the predetermined provider, the determining unit 2255 determines that the non predetermined-provider device executing a function that is not at fault in any device of the predetermined provider exists, in other words, a non predetermined-provider device that executes a function to be charged exists.

In the example illustrated in FIG. 6, since the provider identification information in the record in the second row indicates not Company R as the predetermined provider but Company α and the printing function is at fault (refer to FIG. 18), the child device 30 is not a non predetermined-provider device that executes a function to be charged, the determining unit 255 determines that no non predetermined-provider device that executes a function to be charged exists.

If the determining unit 2255 determines that a non predetermined-provider device executing a function that is not at fault in any device of the predetermined provider exists, the charge processing unit 257 performs charge processing to profit the predetermined provider.

Figure 19:
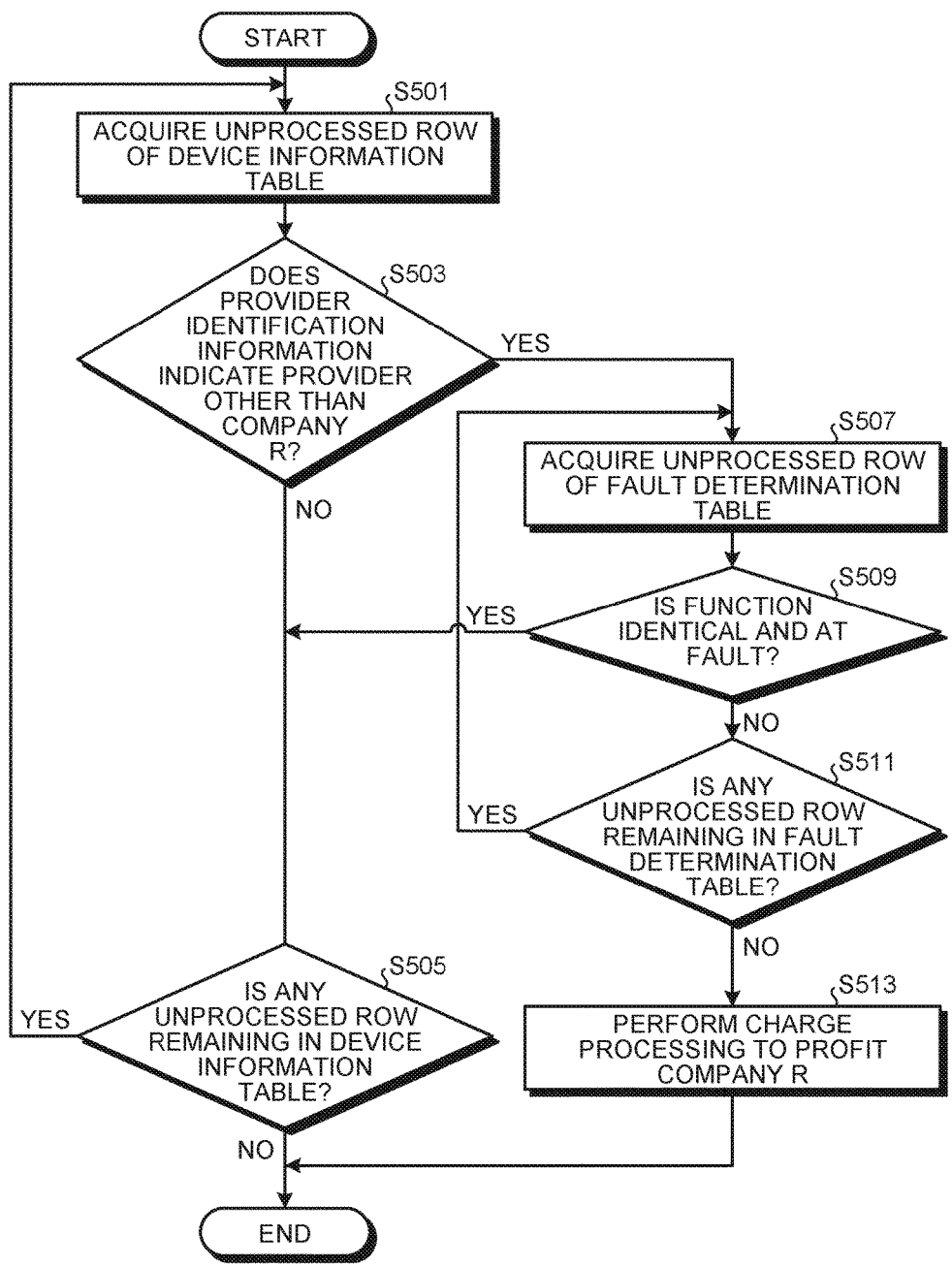
FIG. 19 is a flowchart of a detailed example charge determination processing and charge processing according to the third embodiment.

FIG. 19 is a flowchart of a detailed example of the charge determination processing and the charge processing according to the third embodiment.

Processing from steps S501 to S505 is the same as the processing from steps S201 to S205 in the flowchart illustrated in FIG. 8.

With Yes at step S503, the determining unit 2255 acquires a record in an unprocessed row from a fault determination table (refer to FIG. 18) as function fault information acquired by the function fault information acquiring unit 2265 (step S507). In the third embodiment, a record in an unprocessed row is acquired in ascending order of the row number, but the present invention is not limited thereto.

Subsequently, the determining unit 2255 determines whether the same function is indicated by function identification information between the record in the row acquired at step S501 and the record in the row acquired at step S507, and whether fault occurrence information as a record in the row thus acquired at step S507 indicates that the function is at fault (step S509).

With Yes at step S509, the process proceeds to step S505.

With No at step S509, if any record in an unprocessed row remains in the fault determination table (Yes at step S511), the process returns to step S507. If any record in an unprocessed row remains in the fault determination table (No at step S511), the charge processing unit 257 performs charge processing to profit Company R as the predetermined provider (step S513), and the processing ends.

According to the device information table illustrated in FIG. 6 and the fault determination information illustrated in FIG. 18, a record in the third row of fault determination information indicates that the printing function is at fault, and thus the charge processing to profit Company R is not performed.

The third embodiment can prevent additional charge processing to profit the provider company from being performed when the device of the third party executes the predetermined function using the cooperating function provided by the provider company because a predetermined function of the provider company cannot be used due to fault.

Modification 3

In the embodiments and modifications, when a non predetermined-provider device exists, the charge processing unit may perform the charge processing to profit the predetermined provider in accordance with the number of the non predetermined-provider devices or the number of times that the non predetermined-provider device executes a function. Description of Modification 3 is based on the first embodiment as an example, but is also applicable to other embodiments and other modifications.

Modification 3 describes an example in which the main unit 11, the child device 30, and the child device 40-2 perform the copying operation through cooperation of the document reading function of the main unit 11 and the printing functions of the child device 30 and the child device 40-2, but the present invention is not limited thereto. In Modification 3, the child device 40-2 is a device of Company β and the child device 40-2 is a multifunction peripheral, and thus includes at least the same functional component as that of the child device 30. The server unit 20 performs, on the child device 40-2, the same processing as that performed by the server unit 20 on the child device 30, and the child device 40-2 performs the same processing as that performed by the child device 30.

In this case, the cooperation execution request transmitted by the main unit 11 includes device identification information identifying the main unit 11, function identification information identifying the document reading function associated with the device identification information, device identification information identifying the child device 30, function identification information identifying the printing function associated with the device identification information, execution number information indicating the number of executions of the printing function associated with the function identification information, device identification information identifying the child device 40-2, function identification information identifying the printing function associated with the device identification information, and execution number information indicating the number of executions of the printing function associated with the function identification information. However, the present invention is not limited thereto.

For example, the number of executions of the printing function of the child device 30 is two, and the number of executions of the printing function of the child device 40-2 is one. In this case, the determining unit 255 generates a device information table as illustrated in FIG. 20. In the example illustrated in FIG. 20, the number of executions of the printing function of the child device 30 is two, a record is identical between the second and third rows. In the example illustrated in FIG. 20, the device identification information (IP address) "DD.DD.DD.DD" indicates the child device 40-2.

If the determining unit 255 determines that a non predetermined-provider device exists, the charge processing unit 257 performs charge processing to profit the predetermined provider depending on the number of non predetermined-provider devices or the number of executions of a function by a non predetermined-provider device.

Figure 21:
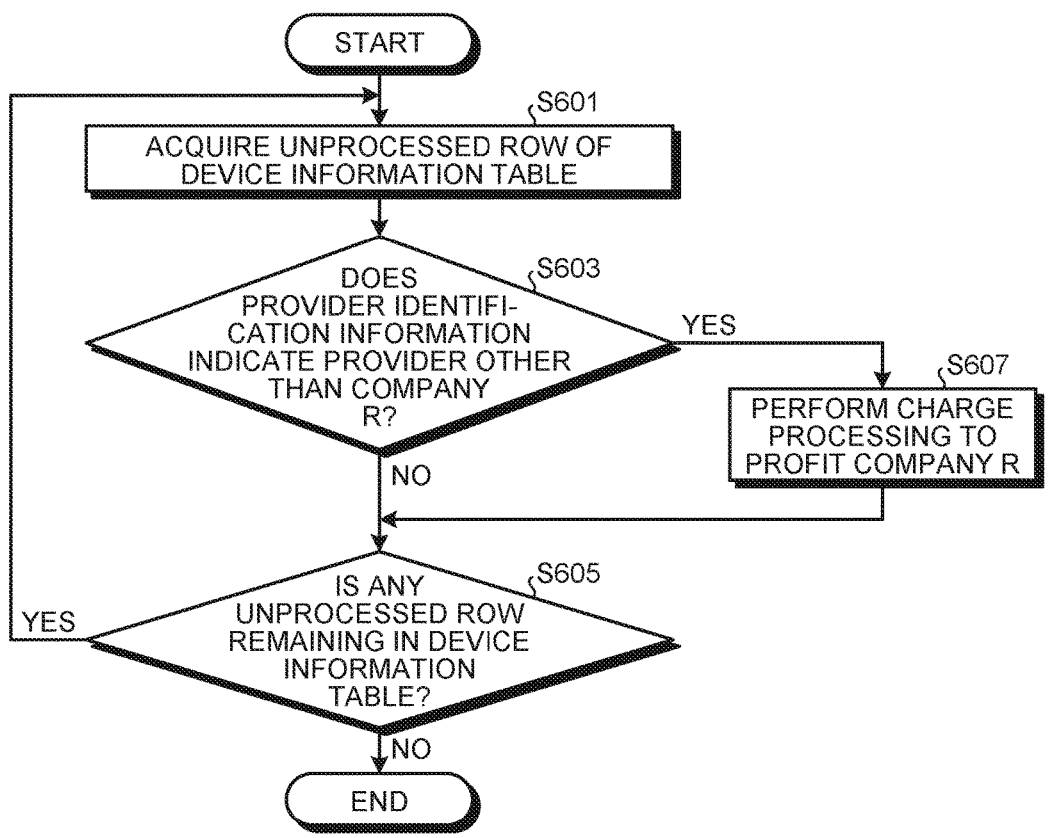
FIG. 21 is a flowchart of a detailed example of charge determination processing and charge processing according to Modification 3.

FIG. 21 is a flowchart of a detailed example of the charge determination processing and the charge processing according to Modification 3.

Processing from steps S601 to S605 is the same as the processing from steps S201 to S205 in the flowchart illustrated in FIG. 8.

With Yes at step S603, the charge processing unit 257 performs charge processing to profit Company R as the predetermined provider (step S607), and the process proceeds to step S605.

According to the device information table illustrated in FIG. 20, the charge processing to profit Company R is performed based on a result of determination on each record in the second to the fourth rows.

According to Modification 3, when the cooperating function is provided by the provider company, additional charge processing to profit the provider company can be performed depending on the number of devices of third parties that execute a function using the cooperating function provided by the provider company or the number of executions of a function by the device of the third party using the cooperating function provided by the provider company.

Modification 4

In the embodiments and the modifications described above, the user may be notified that additional charge processing is performed. The following mainly describes a difference from the first embodiment, and a component having the same function as that in the first embodiment is denoted by the same name and reference sign as those in the first embodiment, with description thereof being omitted.

Description of Modification 4 is based on the first embodiment as an example, but is also applicable to other embodiments and other modifications.

Figure 22:
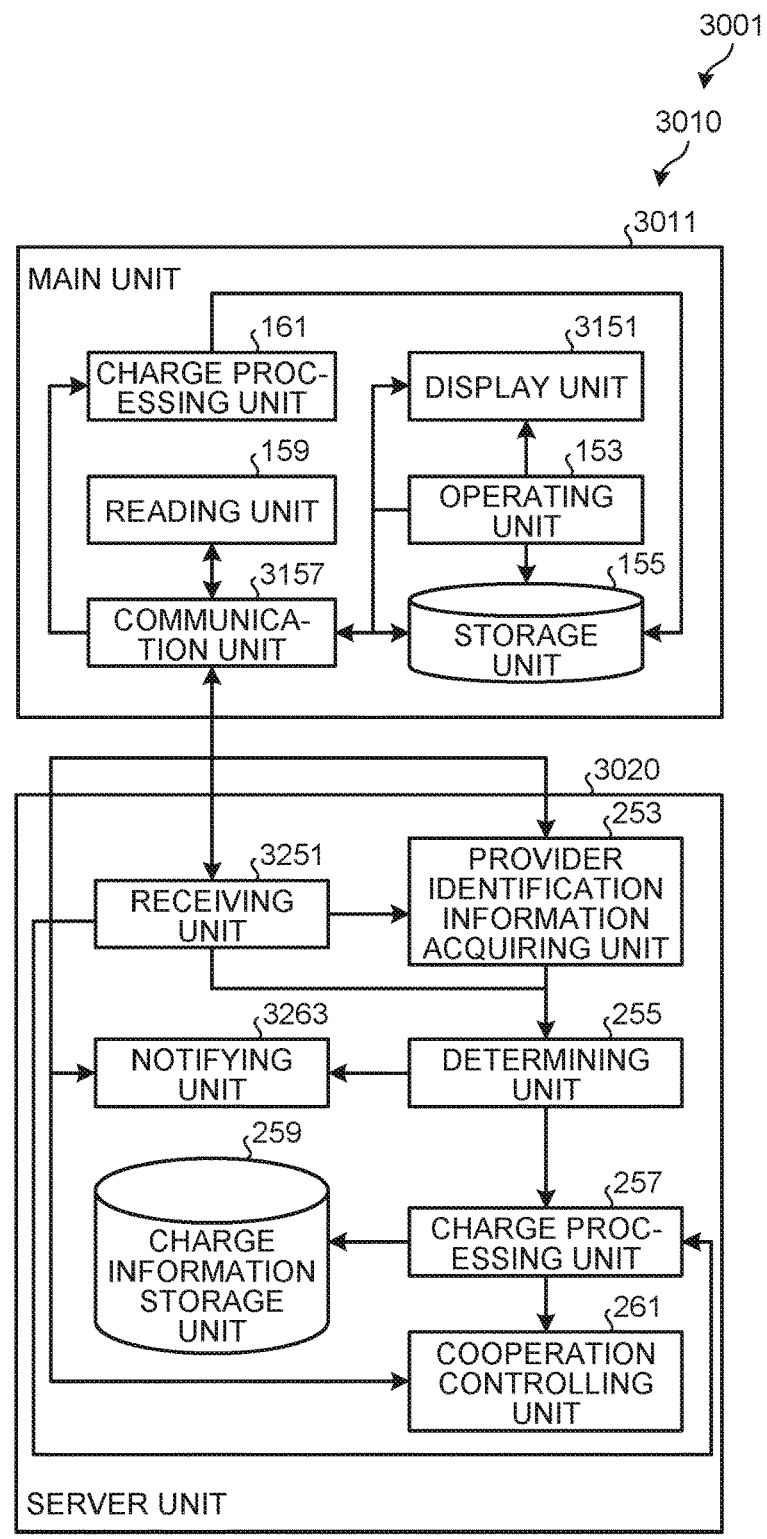
FIG. 22 is a block diagram of an exemplary functional configuration of a main unit and a server unit of a parent device in a charge processing system according to Modification 4 of the present invention.

FIG. 22 is a block diagram of an exemplary functional configuration of a main unit 3011 and a server unit 3020 of a parent device 3010 of a charge processing system 3001 according to Modification 4. As illustrated in FIG. 22, the server unit 3020 according to Modification 4 differs from the server unit 20 in the first embodiment in that the server unit 3020 includes a receiving unit 3251 and a notifying unit 3263. The main unit 3011 according to Modification 4 differs from the server unit 20 in the first embodiment in that the main unit 3011 includes a communication unit 3157 and a display unit 3153. The notifying unit 3263 can be achieved by, for example, the CPU 201, the RAM 205, and the NIC 209.

If the determining unit 255 determines that a non predetermined-provider device exists, the notifying unit 3263 notifies the main unit 3011 as the transmitter of the cooperation execution request that the charge processing to profit Company R as the predetermined provider is performed.

Figure 23:
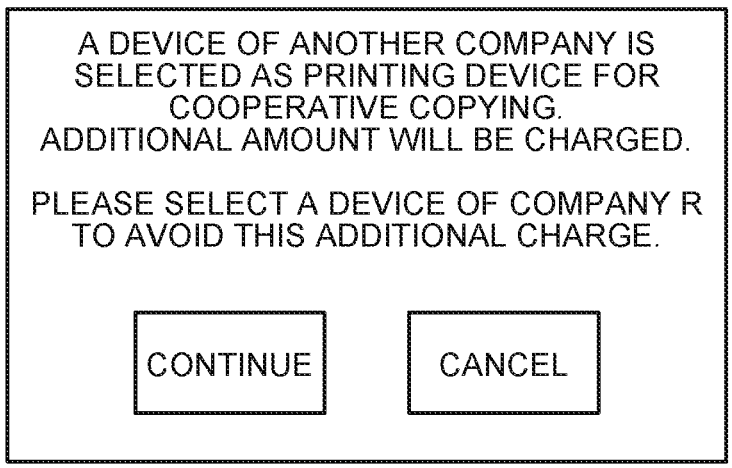
FIG. 23 illustrates an exemplary confirmation screen according to Modification 4.

When the communication unit 3157 is notified from the server unit 3020 that the charge processing is performed, the display unit 3153 displays a confirmation screen as illustrated in FIG. 23 for checking whether to continue a cooperation (the copying operation through cooperation of the document reading function of the main unit 3011 and the printing function of the child device 30). If the operating unit 153 receives selection of continuation of the cooperation on the confirmation screen, the communication unit 3157 notifies the server unit 3020 of the continuation. If the operating unit 153 receives selection of cancellation of the cooperation on the confirmation screen, the communication unit 3157 notifies the server unit 3020 of the cancellation.

If the main unit 3011 notifies the receiving unit 3251 of the continuation, the charge processing unit 257 performs charge processing to profit Company R as the predetermined provider. If the main unit 3011 notifies the receiving unit 3251 of the cancellation, the charge processing unit 257 cancels the charge processing to profit Company R as the predetermined provider, and the cooperation controlling unit 261 cancels the cooperation accordingly.

Figure 24:
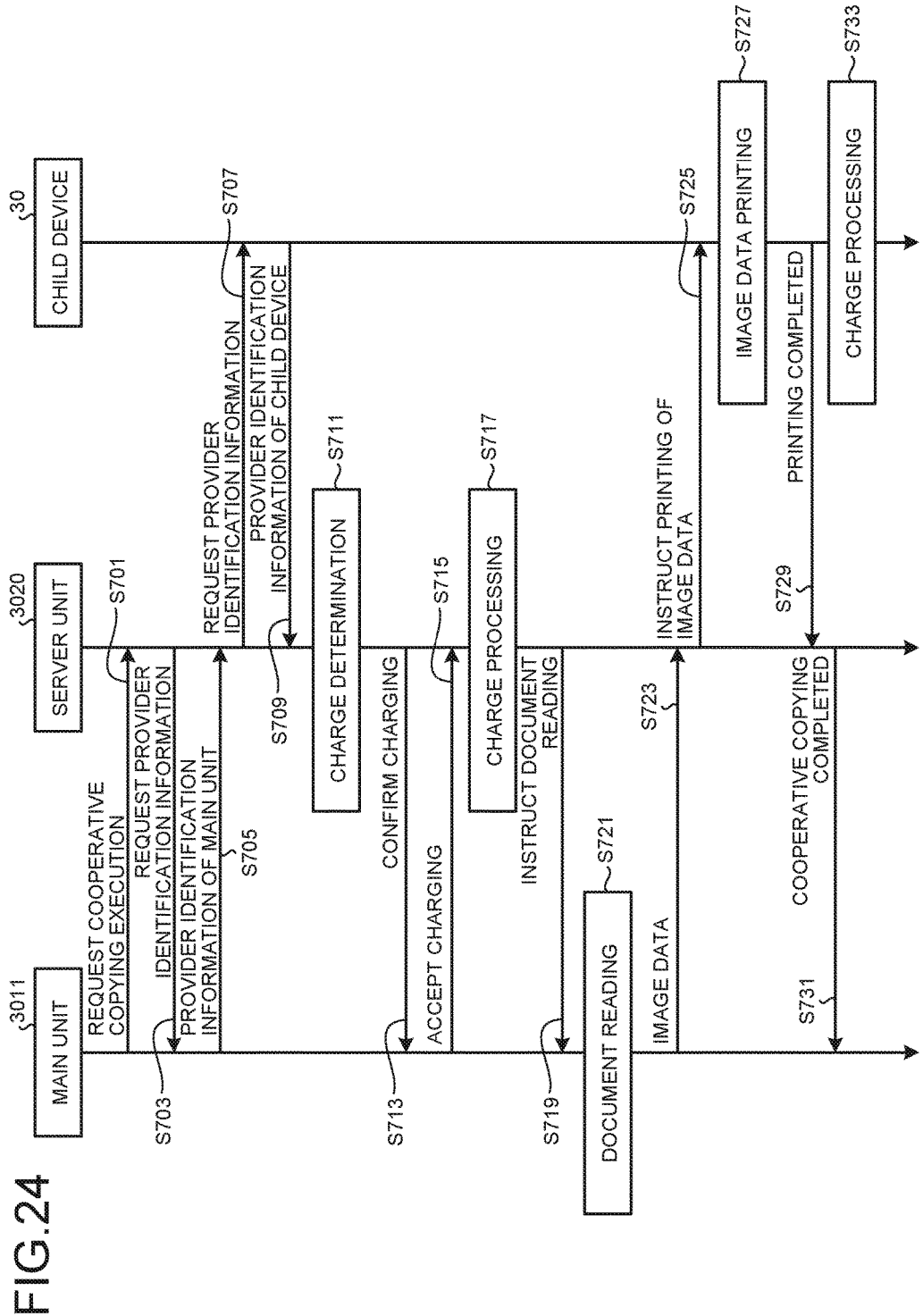
FIG. 24 is a sequence diagram of an exemplary copying operation as cooperation of a document reading function of the main unit and a printing function of a child device according to Modification 4.

FIG. 24 is a sequence diagram of an exemplary copying operation through cooperation of the document reading function of the main unit 3011 and the printing function of the child device 30 according to Modification 4.

Processing from steps S701 to S711 is the same as the processing from steps S101 to Sill in the flowchart illustrated in FIG. 7.

Subsequently, if the determining unit 255 determines that a non predetermined-provider device exists, the notifying unit 3263 notifies the main unit 3011 as the transmitter of the cooperation execution request that the charge processing to profit Company R as the predetermined provider is performed (step S713), the receiving unit 3251 receives, from the main unit 3011, a notification of the continuation of the charge processing to profit Company R as the predetermined provider (step S715).

The subsequent processing from steps S717 to S733 is the same as the processing from steps S113 to S129 in the flowchart illustrated in FIG. 7. If the receiving unit 3251 receives, from the main unit 3011, a notification of the cancellation of the charge processing to profit Company R as the predetermined provider at step S715, the subsequent processing is not performed.

Modification 5

Although the embodiments and the modifications above describe examples in which provider identification information is vendor information indicating a vendor, the provider identification information may be information indicating whether a vendor is the predetermined provider (Company R, for example).

Modification 6

Figure 25:
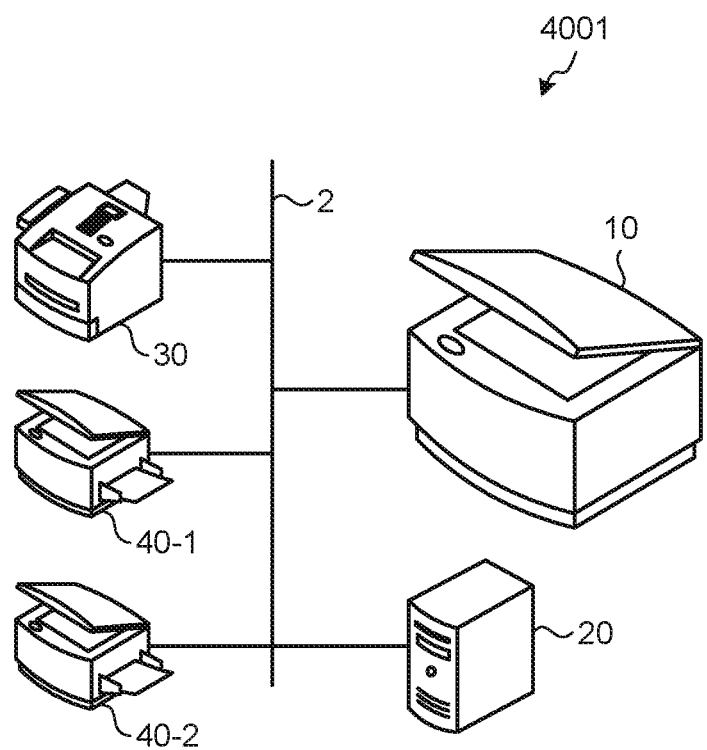
FIG. 25 is a pattern diagram of an exemplary charge processing system according to Modification 5 of the present invention.

Although the first embodiment describes an example in which the server unit 20 is built in the parent device 10 and internally connected with the main unit 11, the server unit 20 may be connected with the network 2 from outside the parent device 10 and connected with the parent device 10 through the network 2 as in a charge processing system 4001 illustrated in FIG. 25. In this case, the parent device 10 corresponds to the main unit 11. The same modification as Modification 6 is additionally applicable not only to the first embodiment but also to the other embodiments and modifications.

Computer Program

A computer program executed by the main unit, the server unit, and the child device according to the embodiments and the modifications described above (hereinafter referred to as "each device of the embodiments and the modifications") is provided as a file in an installable or executable format stored in a non-transitory computer-readable recording medium such as a CD-ROM, a CD-R, a memory card, a digital versatile disk (DVD), or a flexible disk (FD).

A computer program executed by each device of the embodiments and the modifications may be stored in a computer connected to a network such as the Internet and be provided through downloading via the network. Each device of the embodiments and the modifications may be provided or distributed via a network such as the Internet. A computer program executed by each device of the embodiments and the modifications may be incorporated in, for example, a ROM in advance and provided.

A computer program executed by each device of the embodiments and the modifications is configured as a module to achieve the components described above on a computer. The program is loaded onto a RAM from a ROM and executed by a CPU as an example of actual hardware, thereby achieving the functional components described above on a computer.

The exemplary embodiments of the present invention can prevent generation of lost profits of a provider of a cooperating function of enabling a plurality of devices to cooperate.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
   memory storing computer-readable instructions; and
   one or more processors configured to execute the computer-readable instructions such that the one or more processors are configured to perform operations including,
   acquiring a piece of provider identification information for each of a plurality of devices that cooperatively execute a plurality of functions, based on a piece of device identification information of the device, the piece of provider identification information allowing identification of whether a provider of the device is a predetermined provider as a first provider of a cooperating function;

determining, based on pieces of the provider identification information, whether a non predetermined-provider device provided by a second provider other than the predetermined provider exists among the devices;

performing charge processing to profit the predetermined provider when the non predetermined-provider device exists and performs a print job function not performed by the predetermined provider; and controlling the devices to cooperatively execute the functions based on the cooperating function.

2. The information processing apparatus according to claim 1, wherein the one or more processors are configured to perform receiving the pieces of device identification information and a piece of function identification information of a function executed by a device identified by each piece of the device identification information; and acquiring charge determination information including each piece of function identification information and a piece of charge necessity information indicating whether a function indicated by the piece of function identification information is to be charged in association with each other, wherein:

determining whether the non predetermined-provider device that executes a function to be charged exists among the devices based on the pieces of device identification information, the pieces of function identification information, the pieces of provider identification information, and the charge determination information, and performing charge processing to profit the predetermined provider when the non predetermined-provider device that executes the function to be charged exists.

3. The information processing apparatus according to claim 2, wherein the one or more processors are configured to perform:

associating charge necessity information indicating necessity to charge, with reference charge amount information indicating a reference charge amount for determining a charge amount for a function indicated by a piece of function identification information associated with the charge necessity information, and determining, when the non predetermined-provider device that executes the function to be charged exists, a charge amount based on the reference charge amount indicated by the reference charge amount information associated with the piece of function identification information indicating the function, and performs charge processing to profit the predetermined provider.

4. The information processing apparatus according to claim 2, wherein the one or more processors are configured to perform receiving the pieces of device identification information from one of the devices, and notifying the one of the devices that charge processing to profit the predetermined provider is performed when the non predetermined-provider device exists.

5. The information processing apparatus according to claim 2, wherein the one or more processors are internally or externally connected with the one of the devices, and is connected with the devices through a network.

6. The information processing apparatus according to claim 1, wherein the one or more processors are configured to perform:

receiving the pieces of device identification information and a piece of function identification information of a function executed by a device indicated by each piece of the device identification information; and acquiring function fault information including each pair of a piece of device identification information indicating a device of the predetermined provider and a piece of function identification information indicating a function of the device and fault occurrence information indicating whether the function of the device is at fault in association with one another, determining whether the non predetermined-provider device that executes a function that is not at fault in any device of the predetermined provider exists among the devices, based on the pieces of device identification information, the pieces of function identification information, the pieces of provider identification information, and the function fault information, and performing charge processing to profit the predetermined provider when the non predetermined-provider device that executes a function that is not at fault in any device of the predetermined provider exists.

7. The information processing apparatus according to claim 1, wherein the one or more processors are configured to perform, when the non predetermined-provider device exists, charge processing to profit the predetermined provider in accordance with the number of non predetermined-provider devices.

8. The information processing apparatus according to claim 1, the wherein the one or more processors are configured to perform receiving the pieces of device identification information, function identification information of a function executed by a device indicated by each piece of the device identification information, and execution number information indicating the number of executions of the function, and performing charge processing to profit the predetermined provider in accordance with the number of executions of a function by the non predetermined-provider device when the non predetermined-provider device exists.

9. The information processing apparatus according to claim 1, wherein each piece of the provider identification information indicates a provider of the device.

10. The information processing apparatus according to claim 1, wherein each piece of the provider identification information indicates whether a provider of the device is the predetermined provider.

11. The information processing apparatus according to claim 1, wherein the information processing apparatus is connected with the devices through a network.

12. A charge processing method comprising:

acquiring a piece of provider identification information for each of a plurality of devices that cooperatively execute a plurality of functions, based on a piece of device identification information of the device, the piece of provider identification information allowing identification of whether a provider of the device is a predetermined provider as a provider of a cooperating function;

determining whether a non predetermined-provider device provided by a provider other than the predetermined provider exists among the devices based on pieces of the provider identification information;

performing charge processing to profit the predetermined provider when the non predetermined-provider device exists and performs a print job function not performed by the predetermined provider; and controlling the devices to cooperatively execute the functions based on the cooperating function.

13. A non-transitory computer-readable recording medium that contains a computer program that causes a computer to execute:

acquiring a piece of provider identification information for each of a plurality of devices that cooperatively execute a plurality of functions, based on device identification information of the device, the piece of provider identification information allowing identification of whether a provider of the device is a predetermined provider as a provider of a cooperating function;

determining whether a non predetermined-provider device provided by a provider other than the predetermined provider exists among the devices based on pieces of the provider identification information;

performing charge processing to profit the predetermined provider when the non predetermined-provider device exists and performs a print job function not performed by the predetermined provider; and controlling the devices to cooperatively execute the functions based on the cooperating function.

* * * * *